United States Patent
Wei et al.

(10) Patent No.: US 11,910,449 B2
(45) Date of Patent: Feb. 20, 2024

(54) METHODS, INFRASTRUCTURE EQUIPMENT AND WIRELESS COMMUNICATIONS NETWORKS

(71) Applicant: Sony Group Corporation, Tokyo (JP)

(72) Inventors: Yuxin Wei, Basingstoke (GB); Vivek Sharma, Basingstoke (GB); Hideji Wakabayashi, Basingstoke (GB); Yassin Aden Awad, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 184 days.

(21) Appl. No.: 17/606,456

(22) PCT Filed: Apr. 7, 2020

(86) PCT No.: PCT/EP2020/059853
§ 371 (c)(1),
(2) Date: Oct. 26, 2021

(87) PCT Pub. No.: WO2020/221562
PCT Pub. Date: Nov. 5, 2020

(65) Prior Publication Data
US 2022/0201767 A1    Jun. 23, 2022

(30) Foreign Application Priority Data

May 2, 2019    (EP) .................................... 19172411

(51) Int. Cl.
*H04W 88/14*    (2009.01)
*H04W 72/044*    (2023.01)
(Continued)

(52) U.S. Cl.
CPC ..... *H04W 74/0841* (2013.01); *H04W 72/044* (2013.01); *H04W 74/0866* (2013.01); *H04W 88/14* (2013.01); *H04W 92/20* (2013.01)

(58) Field of Classification Search
CPC ........... H04W 72/044; H04W 74/0866; H04W 74/0481; H04W 72/0044; H04W 88/14
(Continued)

(56) References Cited

U.S. PATENT DOCUMENTS 11,533,143 B2 * 12/2022 Wei ..................... H04L 27/2614
2017/0208574 A1     7/2017 Ramakrishna et al.

FOREIGN PATENT DOCUMENTS

WO    2020/057979 A1    3/2020

OTHER PUBLICATIONS

International Search Report and Written Opinion dated Jul. 10, 2020, received for PCT Application PCT/EP2020/059853, Filed on Apr. 7, 2020, 15 pages.
(Continued)

*Primary Examiner* — Dang T Ton
(74) *Attorney, Agent, or Firm* — XSENSUS LLP

(57) ABSTRACT

A method of operating a first infrastructure equipment forming part of a wireless communications network is provided. The method comprises transmitting radio signals to and/or receiving radio signals from a second of infrastructure equipment using frequency resources of a first of bandwidth parts, a first infrastructure equipment being connected to the second infrastructure equipment on a downlink of the first infrastructure equipment and configured to allocate uplink communications resources to the second infrastructure equipment, and transmitting radio signals to and/or receiving radio signals from a third of the infrastructure equipment using frequency resources of a second of bandwidth parts, the first infrastructure equipment being connected to the third infrastructure equipment on an uplink of the first infrastructure equipment and configured to receive allocated uplink communications resources from the third infrastructure equipment.

20 Claims, 12 Drawing Sheets

(51) Int. Cl.
*H04W 74/08* (2009.01)
*H04W 92/20* (2009.01)

(58) Field of Classification Search
USPC .............. 370/329, 395, 407, 406, 402, 403
See application file for complete search history.

(56) References Cited

OTHER PUBLICATIONS

Qualcomm et al., "Proposals on IAB Architecture", 3GPP TSG-RAN WG2 NR Ad hoc 1801, R2-1801606, January Jan. 22-26, 2018, 7 pages.

AT&T et al., "New SID Proposal: Study on Integrated Access and Backhaul for NR", 8881123GPP TSG RAN Meeting #75, RP-170831, Mar. 6-9, 2017, 5 pages.

3GPP, "Study on Integrated Access and Backhaul; (Release 15)", 3GPP TR 38.874 V0.1.0, Feb. 2018, pp. 1-11.

Huawei, "Overview of RAN1 Impacts", 3GPP TSG-RAN WG2 #105bis, R2-1905033, Apr. 8-12, 2019, pp. 1-5.

Samsung, "IAB Failure Recovery as Part of Route Management", 3GPP TSG-RAN WG3 #101, R3-185312, Aug. 20-24, 2018, 2 pages.

3GPP, "Study on Integrated Access and Backhaul (Release 16)", 3GPP TR 38.874 v16.0.0, Dec. 2018, pp. 1-111.

Holma et al., "LTE for UMTS OFDMA and SC-FDMA Based Radio Access", John Wiley & Sons, 2009, pp. 25-27.

Qualcomm et al., "Way Forward—IAB Architecture for L2/3 Relaying", 3GPP TSG-RAN WG3 Meeting #99bis, R3-181502, Apr. 16-20, 2018, 6 pages.

Huawei et al., "Revised Work Item Proposal: Enhancements of Nb-IoT", 3GPP TSG RAN Meeting #73, RP-161901, Sep. 19-22, 2016, 8 pages.

3GPP, "NR; NR and NG-RAN Overall Description; Stage 2 (Release 15)", 3GPP TS 38.300 V15.4.0, Dec. 2018, pp. 1-97.

Nokia et al., "Mechanisms for Resource Multiplexing Among Backhaul And Access Links", 3GPP TSG RAN WG1 #96bis, R1-1904642, Apr. 8-12, 2019, 16 pages.

Samsung, "Resource Multiplexing between Backhaul and Access Links", 3GPP TSG RAN WG1 #96bis, R1-1904417, Apr. 8-12, 2019, pp. 1-6.

Huawei et al., "Resource Multiplexing Between Backhaul and Access in IAB", 3GPP TSG RAN WG1 Meeting #96bis, R1-1903938, Apr. 8-12, 2019, 12 pages.

\* cited by examiner

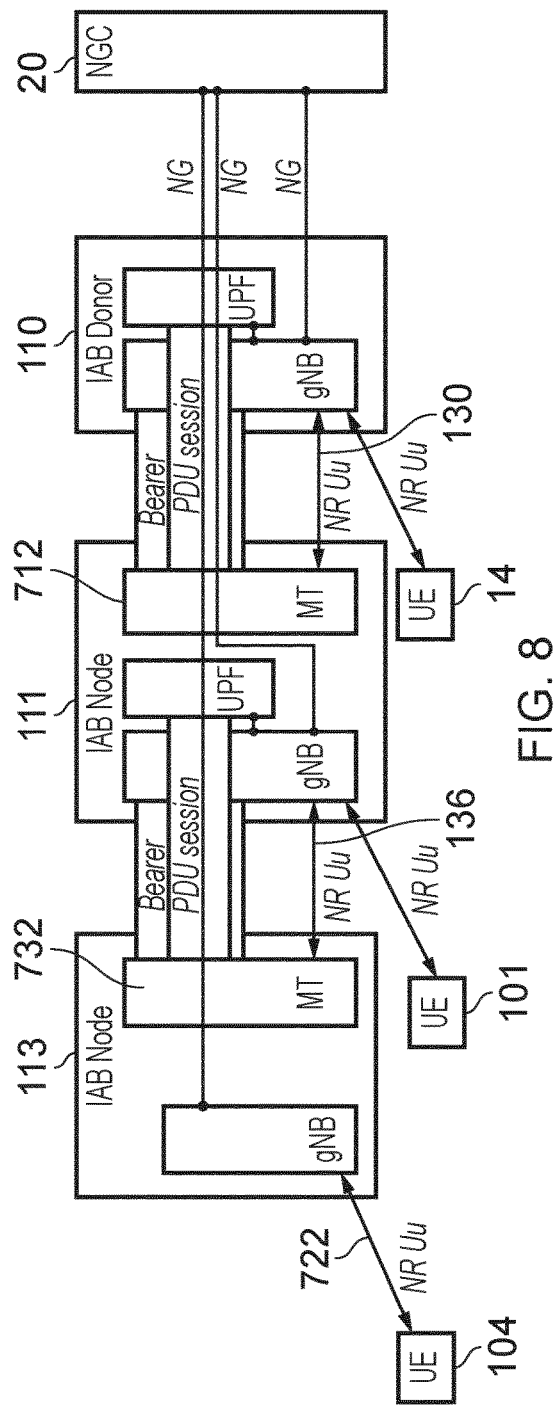
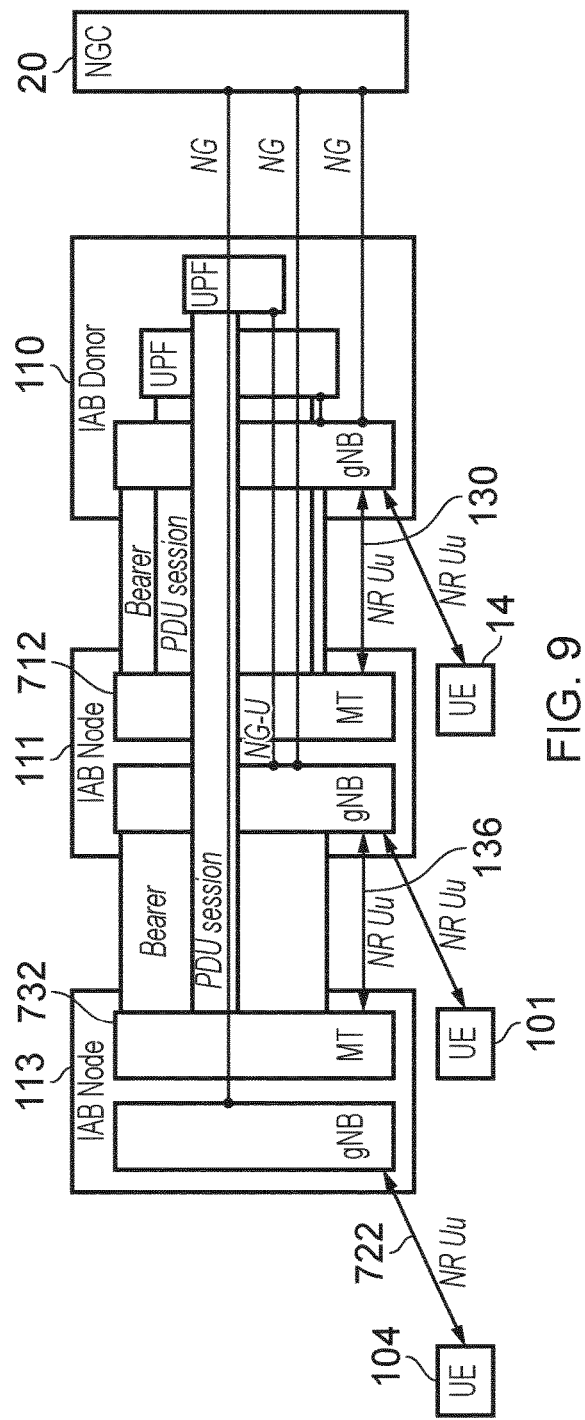
FIG. 8
FIG. 9

METHODS, INFRASTRUCTURE EQUIPMENT AND WIRELESS COMMUNICATIONS NETWORKS

CROSS-REFERENCE TO RELATED APPLICATIONS

The present application is based on PCT filing PCT/EP2020/059853, filed Apr. 7, 2020, which claims priority to EP 19172411.1, filed May 2, 2019, the entire contents of each are incorporated herein by reference.

BACKGROUND

Field of Disclosure

The present disclosure relates to methods and apparatus for the communication of signals between various infrastructure equipment, communications devices and the core network on a wireless backhaul communications link in a wireless communications system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent generation mobile telecommunication systems, such as those based on the 3GPP defined UMTS and Long Term Evolution (LTE) architectures, are able to support a wider range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. In addition to supporting these kinds of more sophisticated services and devices, it is also proposed for newer generation mobile telecommunication systems to support less complex services and devices which make use of the reliable and wide ranging coverage of newer generation mobile telecommunication systems without necessarily needing to rely on the high data rates available in such systems. The demand to deploy such networks is therefore strong and the coverage area of these networks, i.e. geographic locations where access to the networks is possible, may be expected to increase ever more rapidly.

Future wireless communications networks will therefore be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

As radio technologies continue to improve, for example with the development of 5G, the possibility arises for these technologies to be used not only by infrastructure equipment to provide service to wireless communications devices in a cell, but also for interconnecting infrastructure equipment to provide a wireless backhaul. In view of this there is a need to ensure that a donor infrastructure equipment that is physically connected to the core network does not suffer from a "capacity crunch" when a large amount of data is being transmitted from various communications devices and infrastructure equipment to the core network via the donor infrastructure equipment. Furthermore, there is a need to ensure that links between various infrastructure equipment in the backhaul are both stable and reliable.

SUMMARY OF THE DISCLOSURE

The present disclosure can help address or mitigate at least some of the issues discussed above as defined in the appended claims.

Embodiments of the present technique can provide a method of operating a first infrastructure equipment forming part of a wireless communications network. The wireless communications network comprises a plurality of other infrastructure equipment, the first infrastructure equipment being configured to communicate with at least two of the plurality of other infrastructure equipment via a backhaul communications link within a system bandwidth, one or more of the first infrastructure equipment and the plurality of other infrastructure equipment each being configured to communicate with one or more communications devices via an access link within the system bandwidth. The system bandwidth comprises a plurality of bandwidth parts, each of the bandwidth parts being formed of a contiguous set of frequency resources that is smaller than and within the system bandwidth. The method comprises transmitting radio signals to and/or receiving radio signals from a second of the infrastructure equipment using frequency resources of a first of the bandwidth parts, the first infrastructure equipment being connected to the second infrastructure equipment on a downlink of the first infrastructure equipment and configured to allocate uplink communications resources to the second infrastructure equipment, and transmitting radio signals to and/or receiving radio signals from a third of the infrastructure equipment using frequency resources of a second of the bandwidth parts, the first infrastructure equipment being connected to the third infrastructure equipment on an uplink of the first infrastructure equipment and configured to receive allocated uplink communications resources from the third infrastructure equipment. The frequency resources of the first bandwidth part are distinct from and do not overlap with the frequency resources of the second bandwidth part.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIG. 8 is a block diagram illustrating a second possible network architecture for providing a wireless backhaul by means of IAB in a wireless telecommunication network which may be configured to operate in accordance with certain embodiments of the present disclosure;

FIG. 9 is a block diagram illustrating a third possible network architecture for providing a wireless backhaul by means of IAB in a wireless telecommunication network which may be configured to operate in accordance with certain embodiments of the present disclosure;

DETAILED DESCRIPTION OF THE EMBODIMENTS

Long Term Evolution (LTE) Wireless Communications System

Figure 1:
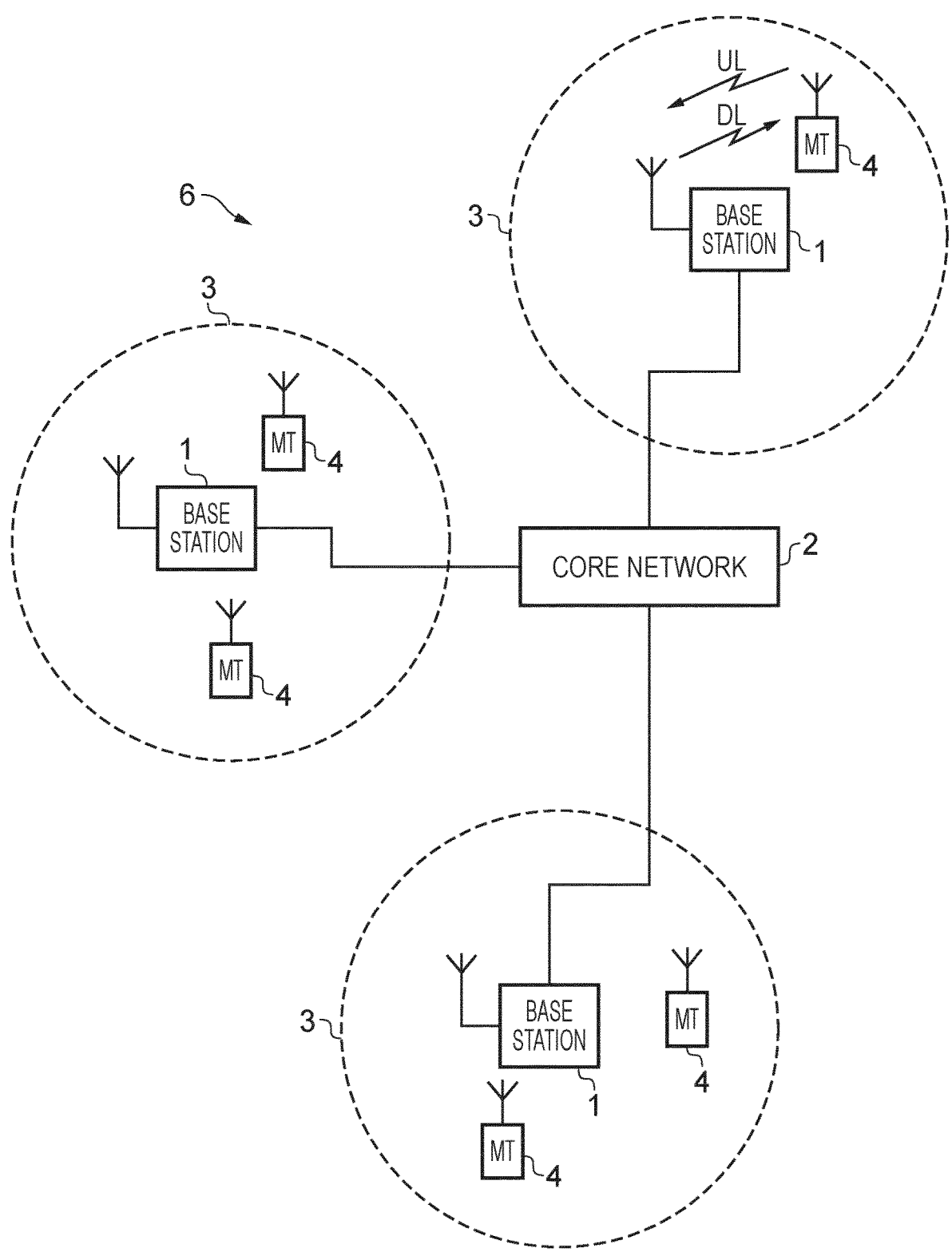
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4.

Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth.

Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G) Wireless Communications System

Figure 2:
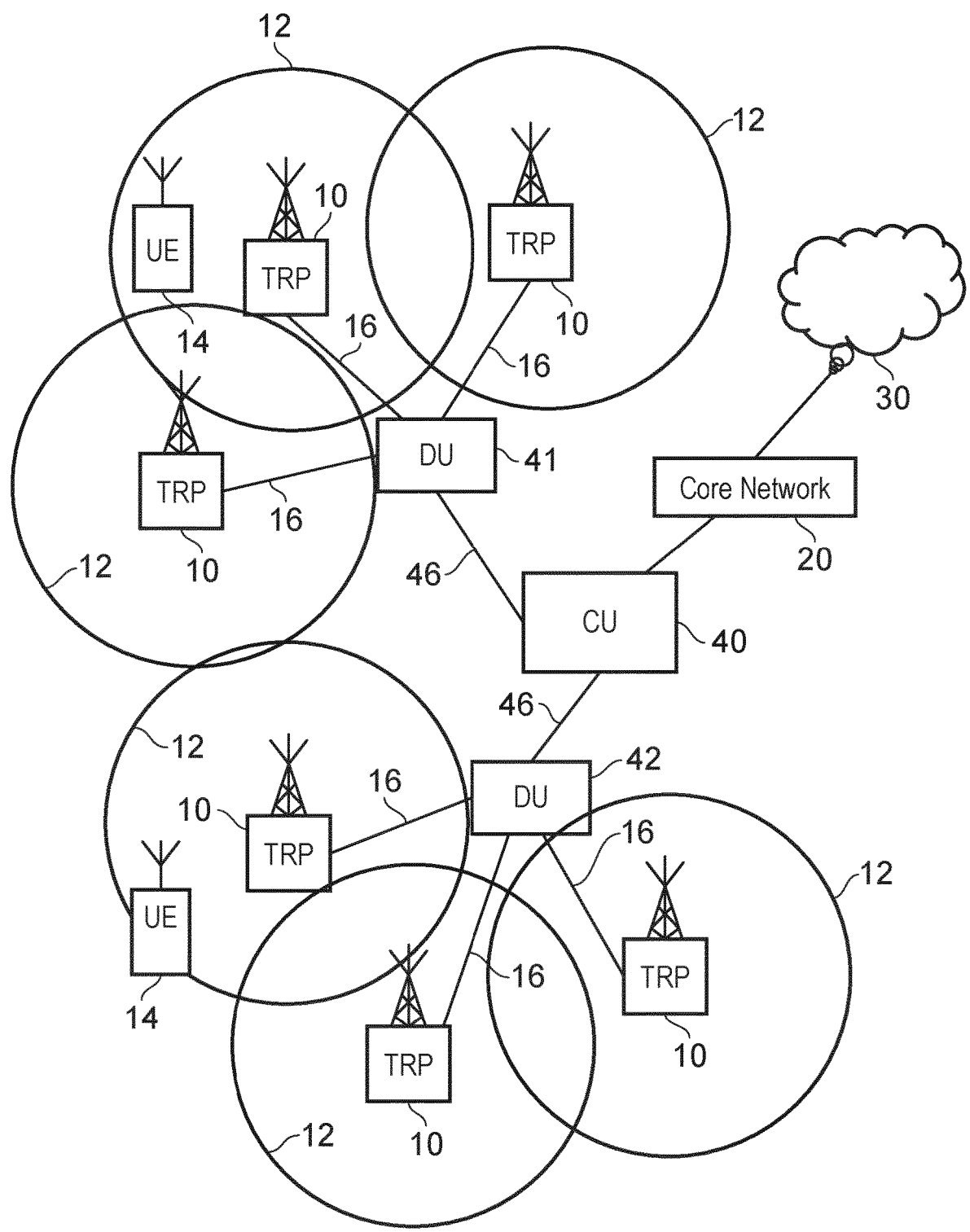
FIG. 2 schematically represents some aspects of a new radio access technology (RAT) wireless communications system which may be configured to operate in accordance with certain embodiments of the present disclosure.

An example configuration of a wireless communications network which uses some of the terminology proposed for NR and 5G is shown in FIG. 2. A 3GPP Study Item (SI) on New Radio Access Technology (NR) has been defined [2]. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the a core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 212 via one of the distributed units 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
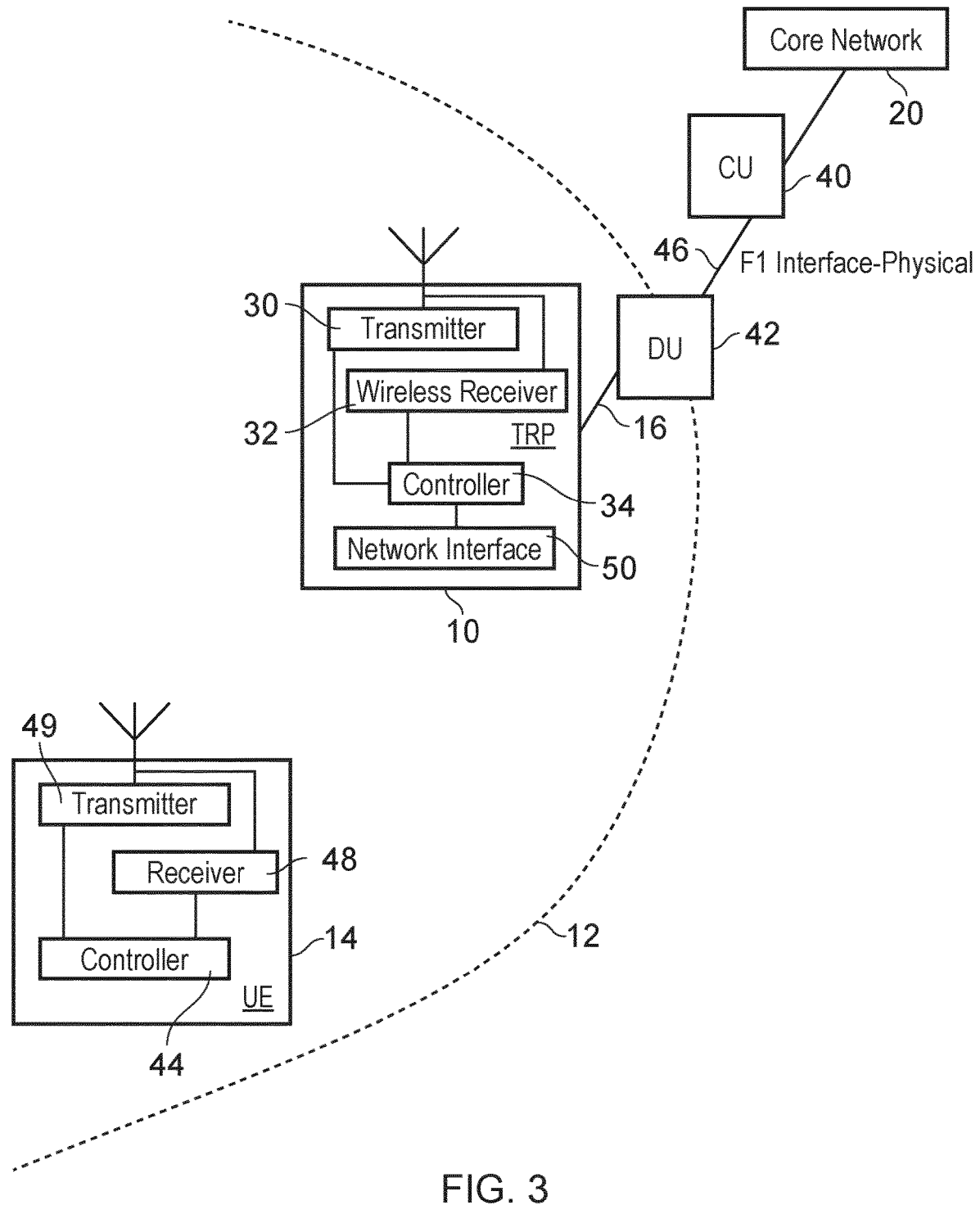
FIG. 3 is a schematic block diagram of some components of the wireless communications system shown in FIG. 2 in more detail in order to illustrate example embodiments of the present technique.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44,48 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium.

As shown in FIG. 3, the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP10 to the DU 42 and the F1 interface 46 from the DU 42 to the CU 40.

Figure 4:
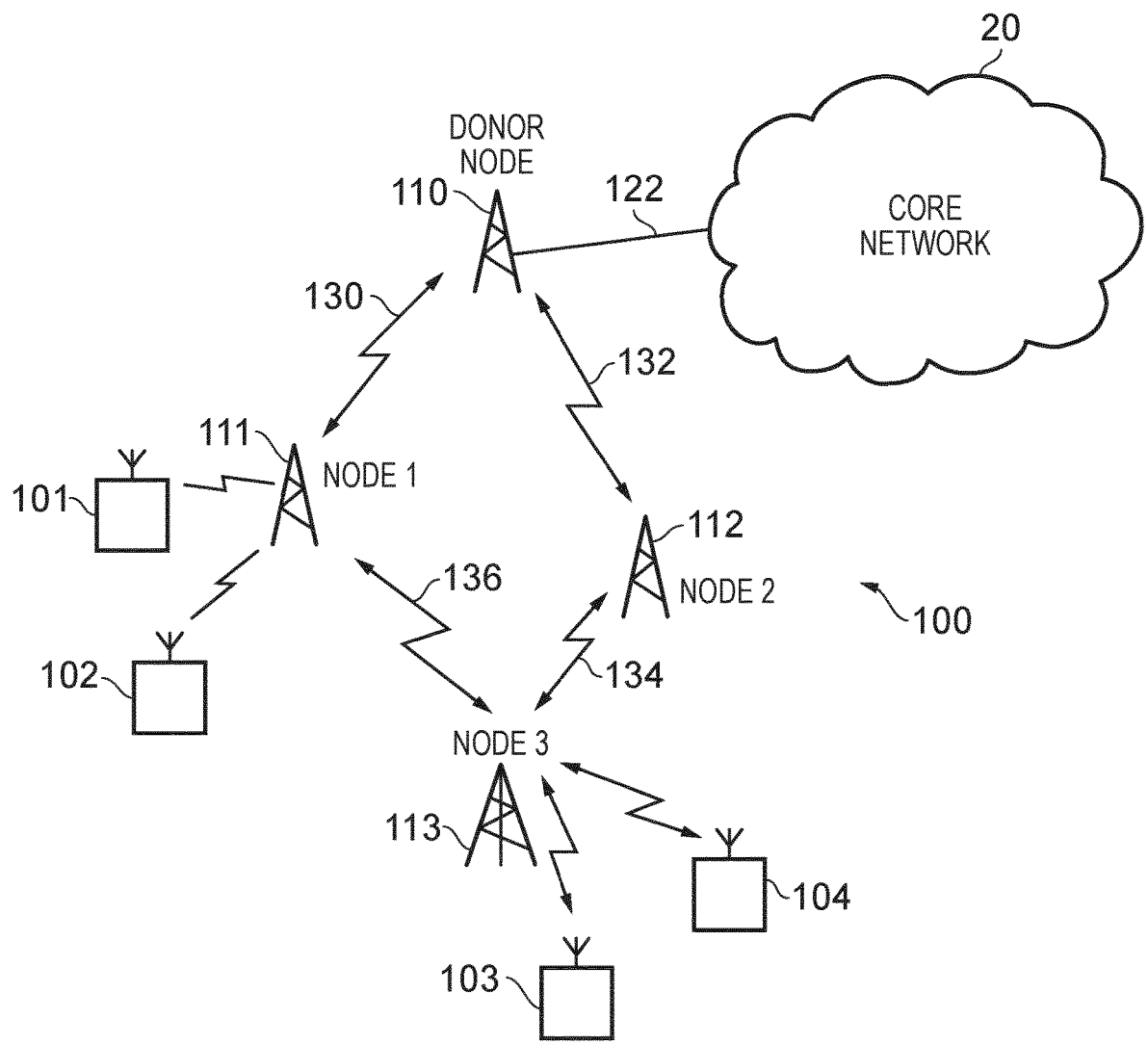
FIG. 4 schematically represents some aspects of an example wireless telecommunication network which may be configured to operate in accordance with certain embodiments of the present disclosure.

Example arrangements of the present technique can be formed from a wireless communications network corresponding to that shown in FIG. 1 or 2, as shown in FIG. 4. FIG. 4 provides an example in which cells of a wireless communications network are formed from infrastructure equipment which are provided with an Integrated Access and Backhaul (IAB) capability. The wireless communications network 100 comprises the core network 20 and a first, a second, a third and a fourth communications device (respectively 101, 102, 103 and 104) which may broadly correspond to the communications devices 4, 14 described above.

The wireless communications network 100 comprises a radio access network, comprising a first infrastructure equipment 110, a second infrastructure equipment 111, a third infrastructure equipment 112, and a fourth infrastructure equipment 113. Each of the infrastructure equipment provides a coverage area (i.e. a cell, not shown in FIG. 4) within which data can be communicated to and from the communications devices 101 to 104. For example, the fourth infrastructure equipment 113 provides a cell in which the third and fourth communications devices 103 and 104 may obtain service. Data is transmitted from the fourth infrastructure equipment 113 to the fourth communications device 104 within its respective coverage area (not shown) via a radio downlink Data is transmitted from the fourth communications device 104 to the fourth infrastructure equipment 113 via a radio uplink.

The infrastructure equipment 110 to 113 in FIG. 4 may correspond broadly to the TRPs 10 of FIG. 2 and FIG. 3.

The first infrastructure equipment 110 in FIG. 4 is connected to the core network 20 by means of one or a series of physical connections. The first infrastructure equipment 110 may comprise the TRP 10 (having the physical connection 16 to the DU 42) in combination with the DU 42 (having a physical connection to the CU 40 by means of the F1 interface 46) and the CU 40 (being connected by means of a physical connection to the core network 20).

However, there is no direct physical connection between any of the second infrastructure equipment 111, the third infrastructure equipment 112, and the fourth infrastructure equipment 113 and the core network 20. As such, it may be necessary (or, otherwise determined to be appropriate) for data received from a communications device (i.e. uplink data), or data for transmission to a communications device (i.e. downlink data) to be transmitted to or from the core network 20 via other infrastructure equipment (such as the first infrastructure equipment 110) which has a physical connection to the core network 20, even if the communications device is not currently served by the first infrastructure equipment 110 but is, for example, in the case of the wireless communications device 104, served by the fourth infrastructure equipment 113.

The second, third and fourth infrastructure equipment 111 to 113 in FIG. 4 may each comprise a TRP, broadly similar in functionality to the TRPs 10 of FIG. 2.

In some arrangements of the present technique, one or more of the second to fourth infrastructure equipment 111 to 113 in FIG. 4 may further comprise a DU 42, and in some arrangements of the present technique, one or more of the second to fourth infrastructure equipment 110 to 113 may comprise a DU and a CU.

In some arrangements of the present technique, the CU 40 associated with the first infrastructure equipment 110 may perform the function of a CU not only in respect of the first infrastructure equipment 110, but also in respect of one or more of the second, the third and the fourth infrastructure equipment 111 to 113.

In order to provide the transmission of the uplink data or the downlink data between a communications device and the core network, a route is determined by any suitable means, with one end of the route being an infrastructure equipment physically connected to a core network and by which uplink and downlink traffic is routed to or from the core network.

In the following, the term 'node' is used to refer to an entity or infrastructure equipment which forms a part of a route for the transmission of the uplink data or the downlink data.

An infrastructure equipment which is physically connected to the core network and operated in accordance with an example arrangement may provide communications resources to other infrastructure equipment and so is referred to as a 'donor node'. An infrastructure equipment which acts as an intermediate node (i.e. one which forms a part of the route but is not acting as a donor node) is referred to as a 'relay node'. It should be noted that although such intermediate node infrastructure equipment act as relay nodes on the backhaul link, they may also provide service to communications devices. The relay node at the end of the route which is the infrastructure equipment controlling the cell in which the communications device is obtaining service is referred to as an 'end node'.

In the wireless network illustrated in FIG. 4, each of the first to fourth infrastructure equipment 110 to 113 may therefore function as nodes. For example, a route for the transmission of uplink data from the fourth communications device 104 may consist of the fourth infrastructure equipment 113 (acting as the end node), the third infrastructure equipment 112 (acting as a relay node), and the first infrastructure equipment 110 (acting as the donor node). The first infrastructure 110, being connected to the core network 20, transmits the uplink data to the core network 20.

For clarity and conciseness in the following description, the first infrastructure equipment 110 is referred to below as the 'donor node', the second infrastructure equipment 111 is referred to below as 'Node 1', the third infrastructure equipment 112 is referred to below as 'Node 2' and the fourth infrastructure equipment 113 is referred to below as 'Node 3'.

For the purposes of the present disclosure, the term 'upstream node' is used to refer to a node acting as a relay node or a donor node in a route, which is a next hop when used for the transmission of data via that route from a wireless communications device to a core network. Similarly, 'downstream node' is used to refer to a relay node from which uplink data is received for transmission to a core network. For example, if uplink data is transmitted via a route comprising (in order) the Node 3 113, the Node 1 111 and the donor node 110, then the donor node 110 is an upstream node with respect to the Node 1 111, and the Node 3 113 is a downstream node with respect to the Node 1 111.

More than one route may be used for the transmission of the uplink/downlink data from/to a given communications device; this is referred to herein as 'multi-connectivity'. For example, the uplink data transmitted by the wireless communications device 104 may be transmitted either via the Node 3 113 and the Node 2 112 to the donor node 110, or via the Node 3 113 and the Node 1 111 to the donor node 110.

In the following description, example arrangements are described in which each of the nodes is an infrastructure equipment; the present disclosure is not so limited. A node may comprise at least a transmitter, a receiver and a controller. In some arrangements of the present technique, the functionality of a node (other than the donor node) may be carried out by a communications device, which may be the communications device 4 (of FIG. 1) or 14 (of FIG. 2), adapted accordingly. As such, in some arrangements of the present technique, a route may comprise one or more communications devices. In other arrangements, a route may consist of only a plurality of infrastructure equipment.

In some arrangements of the present technique, an infrastructure equipment acting as a node may not provide a wireless access interface for the transmission of data to or by a communications device other than as part of an intermediate transmission along a route.

In some arrangements of the present technique, a route is defined considering a wireless communications device (such as the wireless communications device 104) as the start of a route. In other arrangements a route is considered to start at an infrastructure equipment which provides a wireless access interface for the transmission of the uplink data by a wireless communications device.

Each of the first infrastructure equipment acting as the donor node 110 and the second to fourth infrastructure equipment acting as the Nodes 1-3 111-113 may communicate with one or more other nodes by means of an inter-node wireless communications link, which may also be referred to as a wireless backhaul communications links. For example, FIG. 4 illustrates four inter-node wireless communications links 130, 132, 134, 136.

Each of the inter-node wireless communications links 130, 132, 134, 136 may be provided by means of a respective wireless access interface. Alternatively, two or more of the inter-node wireless communications links 130, 132, 134, 136 may be provided by means of a common wireless access interface and in particular, in some arrangements of the present technique, all of the inter-node wireless communications links 130, 132, 134, 136 are provided by a shared wireless access interface.

A wireless access interface which provides an inter-node wireless communications link may also be used for communications between an infrastructure equipment (which may be a node) and a communications device which is served by the infrastructure equipment. For example, the fourth wireless communications device 104 may communicate with the infrastructure equipment Node 3 113 using the wireless access interface which provides the inter-node wireless communications link 134 connecting the Node 3 113 and the Node 2 112.

The wireless access interface(s) providing the inter-node wireless communications links 130, 132, 134, 136 may operate according to any appropriate specifications and techniques. In some arrangements of the present technique, a wireless access interface used for the transmission of data from one node to another uses a first technique and a wireless access interface used for the transmission of data between an infrastructure equipment acting as a node and a communications device may use a second technique different from the first. In some arrangements of the present technique, the wireless access interface(s) used for the transmission of data from one node to another and the wireless access interface(s) used for the transmission of data between an infrastructure equipment and a communications device use the same technique.

Examples of wireless access interface standards include the third generation partnership project (3GPP)-specified GPRS/EDGE ("2G"), WCDMA (UMTS) and related standards such as HSPA and HSPA+("3G"), LTE and related standards including LTE-A ("4G"), and NR ("5G"). Techniques that may be used to provide a wireless access interface include one or more of TDMA, FDMA, OFDMA, SC-FDMA, CDMA. Duplexing (i.e. the transmission over a wireless link in two directions) may be by means of frequency division duplexing (FDD) or time division duplexing (TDD) or a combination of both.

In some arrangements of the present technique, two or more of the inter-node wireless communications links 130, 132, 134, 136 may share communications resources. This may be because two or more of the inter-node wireless communications links 130, 132, 134, 136 are provided by means of a single wireless access interface or because two or more of the inter-node wireless communications links 130, 132, 134, 136 nevertheless operate simultaneously using a common range of frequencies.

The nature of the inter-node wireless communications links 130, 132, 134, 136 may depend on the architecture by which the wireless backhaul functionality is achieved.

Integrated Access and Backhaul (IAB) for NR

A new study item on Integrated Access and Backhaul for NR [3] has been approved. Several requirements and aspects for the integrated access and wireless backhaul for NR to address are discussed in [3], which include:

Efficient and flexible operation for both inband and outband relaying in indoor and outdoor scenarios;
Multi-hop and redundant connectivity;
End-to-end route selection and optimisation;
Support of backhaul links with high spectral efficiency;

Support of legacy NR UEs.

The stated objective of the study detailed in [3] is to identify and evaluate potential solutions for topology management for single-hop/multi-hop and redundant connectivity, route selection and optimisation, dynamic resource allocation between the backhaul and access links, and achieving high spectral efficiency while also supporting reliable transmission.

Figure 5:
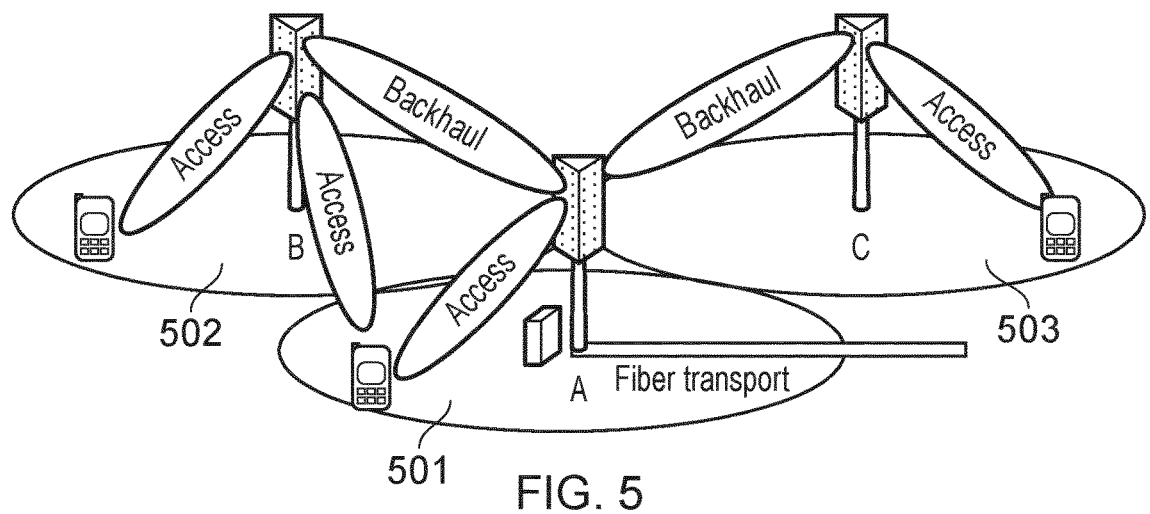
FIG. 5 is reproduced from [3], and provides a first example of an Integrated Access and Backhaul (IAB) deployment scenario.

FIG. 5 shows the scenario presented in [3], where a backhaul link is provided from cell site A 501 to cells B 502 and C 504 over the air. It is assumed that cells B 502 and C 504 have no wired backhaul connectivity. Considering the CU/DU split architecture in NR as described above, it can be assumed that all of cells A 501, B 502 and C 504 have a dedicated DU unit and are controlled by the same CU.

Several architecture requirements for IAB are laid out in [4]. These include the support for multiple backhaul hops, that topology adaptation for physically fixed relays shall be supported to enable robust operation, minimisation of impact to core network specifications, consideration of impact to core networking signalling load, and Release 15 NR specifications should be reused as much as possible in the design of the backhaul link, with enhancements considered.

Figure 6A:
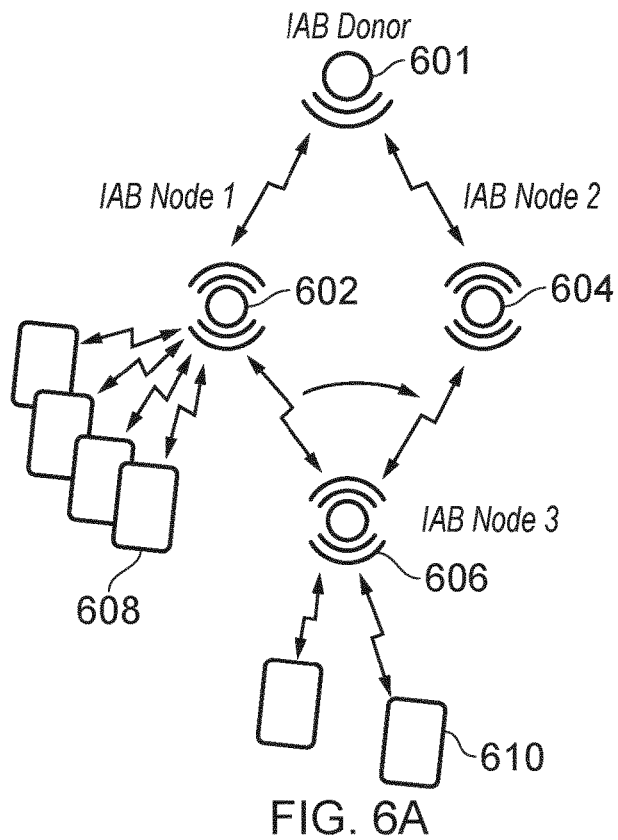
FIG. 6A is reproduced from [5], and provides a second example of an IAB deployment scenario in which there are multiple candidate routes each comprising multiple hops from the end node to the donor node.

FIG. 6A is reproduced from [5], and shows an example of a wireless communications system comprising a plurality of IAB-enabled nodes, which may for example be TRPs forming part of an NR network. These comprise an IAB donor node 601 which has a connection to the core network, two IAB nodes (a first IAB node 602 and a second IAB node 604) which have backhaul connections to the IAB donor node 601, and a third IAB node 606 (or end IAB node) which has a backhaul connection to each of the first IAB node 602 and the second IAB node 604. Each of the first IAB node 601 and third IAB node 606 have wireless access connections to UEs 608 and 610 respectively. As shown in FIG. 6A, originally the third IAB node 606 may communicate with the IAB donor node 601 via the first IAB node 602. After the second IAB node 604 emerges, there are now two candidate routes from the third IAB node 606 to the IAB donor node 601; via the first IAB node 602 and via the new second IAB node 604. The new candidate route via the second IAB node 604 will play an important role when there is a blockage in the first IAB node 602 to IAB donor node 604 link Hence, knowing how to manage the candidate routes efficiently and effectively is important to ensure timely data transmission between relay nodes, especially when considering the characteristics of wireless links.

In the case that the link between the first IAB node 602 and the third IAB node 606 is deteriorating, or the first IAB node 602 becomes overloaded, one of the nodes in the system (this could be the donor node 601 or the first IAB node 602 itself) will need to make a decision to change the route from the third IAB node 606 to the IAB donor node 601 from that via the first IAB node 602 to that via the second IAB node 604.

In FIG. 6A, only the IAB Donor gNB 601 has a fixed line backhaul into the core network. It should be assumed in this case that the traffic from all the UEs 610 within the third IAB node's 606 coverage is backhauled firstly to the first IAB node 602. This backhaul link must compete for capacity on the component carrier serving the first IAB Node 602 with all the UEs 608 within the coverage area of the first IAB Node 602. In the relevant art, the first IAB Node 602 in such a system as that of FIG. 6A is called a "hop"—it relays communications between the end (third) IAB node 606 and the donor IAB node 601. The backhaul link to the first IAB Node 602 requires enough capacity to support the traffic from all the UEs 610, bearing in mind that some of these may have stringent quality of service (QoS) requirements that translate into high traffic intensities.

Figure 6B:
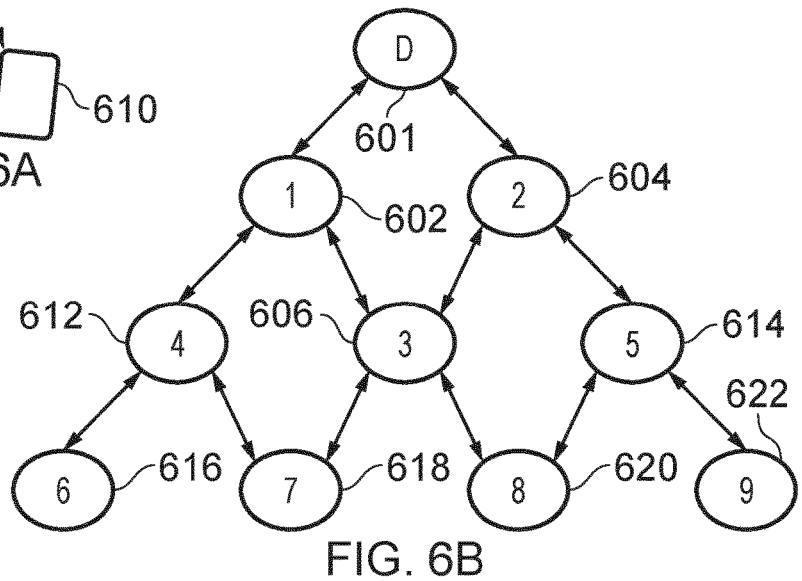
FIG. 6B is an extended version of FIG. 6A, providing a third example of an IAB deployment scenario in which there are multiple candidate routes each comprising multiple hops from the end node to the donor node.

FIG. 6B is an extended version of FIG. 6A, and shows what happens when there are multiple layers of IAB nodes in the deployment scenario. In the example of FIG. 6A, the third IAB node 606 is the child node of the first IAB node 602, and the first IAB node 602 may be the parent node of the third IAB node 606. However, a parent node may not necessarily be the next node up (i.e. one hop in the uplink direction) towards the IAB donor node 601. A parent node may be more than one hop away from its child node or children nodes, and is in a general sense configured to allocate uplink communications resources to the child node. For example, the donor IAB node 601 may in fact be the parent node of the third IAB node 606. This is shown with greater clarity in FIG. 6B.

In FIG. 6B, in addition to IAB node 601, 602, 604 and 606 as shown in FIG. 6A, there are additional IAB nodes 612 and 614 at the same layer or level of the network as IAB node 606. Below these are IAB nodes 616, 618, 620 and 622, which are now end nodes, in that they have no downlink backhaul connections to other IAB nodes. Here, it could be that the first IAB node 602 is still the parent of the third IAB node 606, but may also be the parent of IAB node 612. Further, the first IAB node 602 may be the parent of IAB nodes 616, 618 and 620 too, or may be a grandparent node to these nodes if nodes 606 and 612 are their parents. Furthermore, some child nodes may have multiple parent nodes, and can select from between them when transmitted uplink data in dependence on certain criteria, such as relative link qualities between the child node and its multiple parent nodes, or a relative load status between the parent nodes, for example.

Various architectures have been proposed in order to provide the IAB functionality. The below described embodiments of the present technique are not restricted to a particular architecture. However, a number of candidate architectures which have been considered in, for example, 3GPP document [6] are described below.

Figure 7:
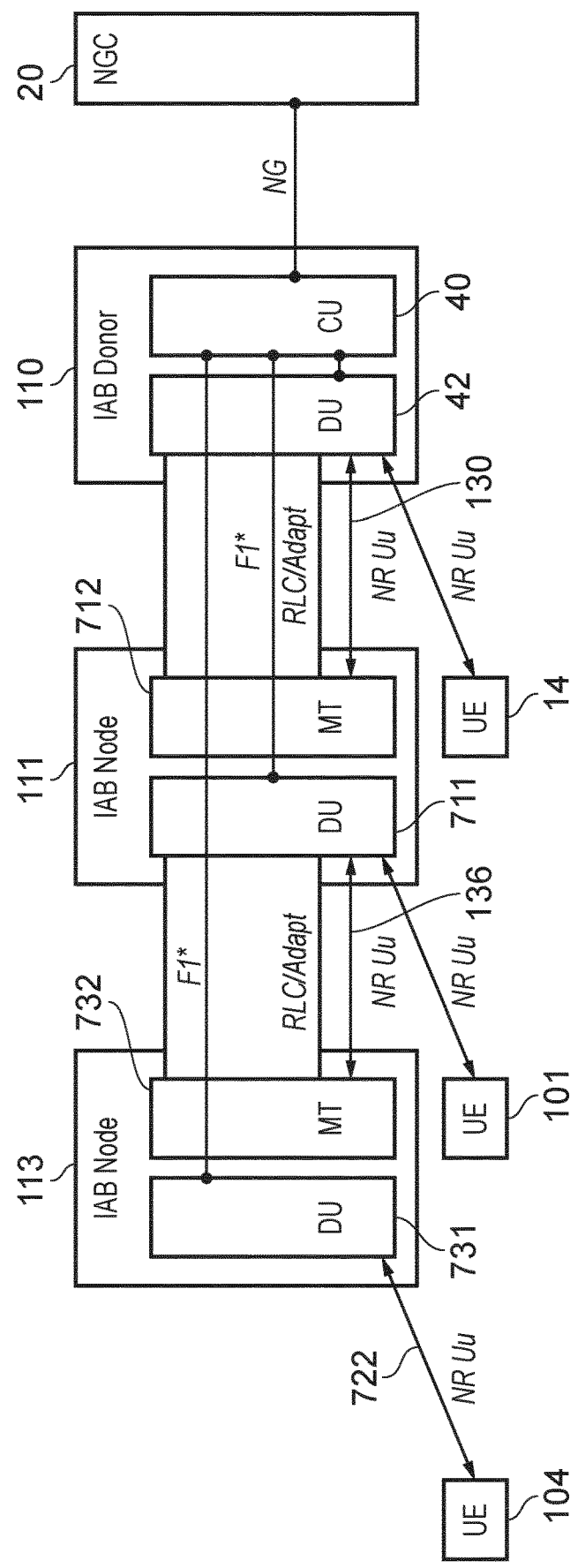
FIG. 7 is a block diagram illustrating a first possible network architecture for providing a wireless backhaul by means of IAB in a wireless telecommunication network which may be configured to operate in accordance with certain embodiments of the present disclosure.

FIG. 7 illustrates one possible architecture, sometimes referred to as "Architecture 1a", by which the donor Node 110, the Node 1 111 and the Node 3 113 may provide a wireless backhaul to provide connectivity for the UEs 104, 101, 14.

In FIG. 7, each of the infrastructure equipment acting as an IAB nodes 111, 113 and the donor node 110, includes a distributed unit (DU) 42, 711, 731 which communicates with the UEs 14, 101, 104 and (in the case of the DUs 42, 511 associated with the donor node 110 and the Node 1 111) with the respective downstream IAB nodes 111, 113. Each of the IAB nodes 111, 113 (not including the donor node 110) includes a mobile terminal (MT) 712, 732, which includes a transmitter and receiver (not shown) for transmitting and receiving data to and from the DU of an upstream IAB node and an associated controller (not shown). The inter-node wireless communications links 130, 136 may be in the form of new radio (NR) "Uu" wireless interface. The mobile terminals 712, 732 may have substantially the same functionality as a UE, at least at the access stratum (AS) layer. Notably, however, an MT may not have an associated subscriber identity module (SIM) application; a UE may be conventionally considered to be the combination of an MT and a SIM application.

The Uu wireless interfaces used by IAB nodes to communicate with each other may also be used by UEs to transmit and receive data to and from the DU of the upstream IAB node. For example, the Uu interface 720 which is used by the Node 1 111 for communication with the donor node 110 may also be used by the UE 14 to transmit and receive data to and from the donor node 110.

Similarly, an end node (such as the Node 3 113) may provide a Uu wireless interface 722 for the fourth UE 104 to communicate with the DU 731 of the Node 3 113.

Alternative candidate architectures for the provision of IAB are provided in FIG. 8 and FIG. 9, sometimes referred to as "Architectures 2a and 2b" respectively. In both FIG. 8 and FIG. 9, each IAB node includes a gNB function, providing a wireless access interface for the use of downstream IAB nodes and wireless communications devices.

FIG. 9 differs from FIG. 7 in that, in FIG. 7, PDU sessions are connected end-on-end to form the wireless backhaul; in FIG. 9, PDU sessions are encapsulated so that each IAB node may establish an end-to-end PDU session which terminates at the IAB donor node 110.

Radio Link Failure (RLF)

A number of radio link failure (RLF) scenarios have been agreed in [7]. These scenarios are illustrated and explained with respect to FIGS. 10A, 10B and 10C, which have been reproduced from [7]. Each of FIGS. 10A, 10B and 10C show example IAB networks each comprising two donor IAB nodes; donor node A1 1002 and donor node A2 1004.

Figure 10A:
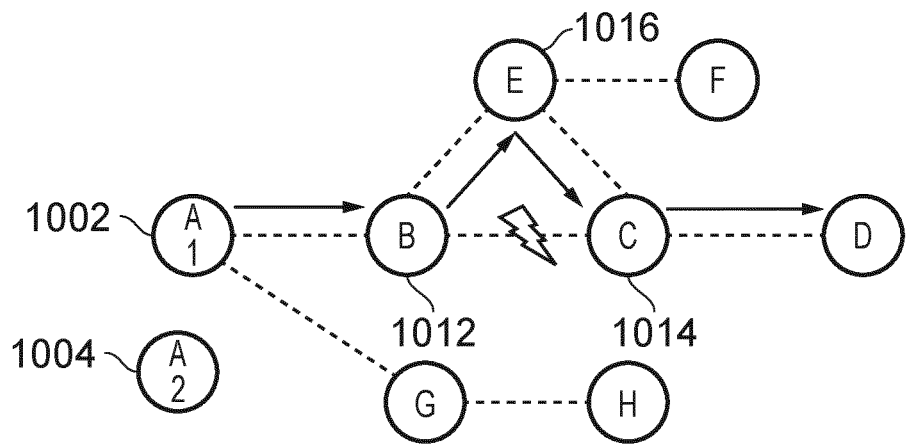
FIG. 10A is reproduced from [7], and shows a first example radio link failure example in IAB networks.

A first scenario is shown in FIG. 10A. Here, the RLF occurs between one of the parent IAB nodes (e.g. node B 1012) and the child IAB node (e.g., node C 1014), but the child node 1014 has an additional link established to another parent node, (e.g. node E 1016). When such an RLF occurs between the child node 1014 and parent node 1012, the child node 1014 can simply fall back on the other parent node 1016, which is able to relay communications between the child node 1014 and the donor node 1002 via the original parent node 1012.

Figure 10B:
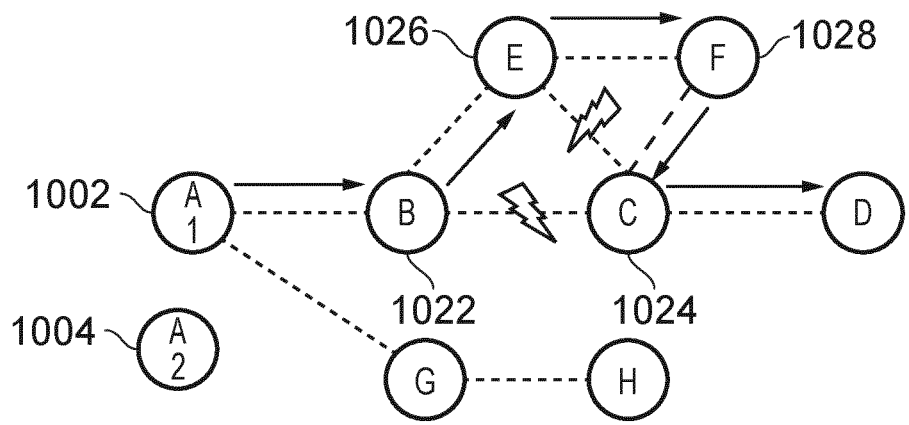
FIG. 10B is reproduced from [7], and shows a second example radio link failure example in IAB networks.

A second scenario is shown in FIG. 10B. Here, the RLF occurs between all parent IAB nodes (e.g., node B 1022 and E 1026) and the child IAB node (e.g., node C 1024). The child node 1024 therefore has no working links to any of its known parent nodes 1022, 1026, and so has to reconnect to a new parent node. In the example of FIG. 10B, the child node 1024 establishes a new connection with new parent node F 1028, which is able to relay communications between the child node 1024 and the donor node 1002 via both original parent nodes 1022, 1026.

Figure 10C:
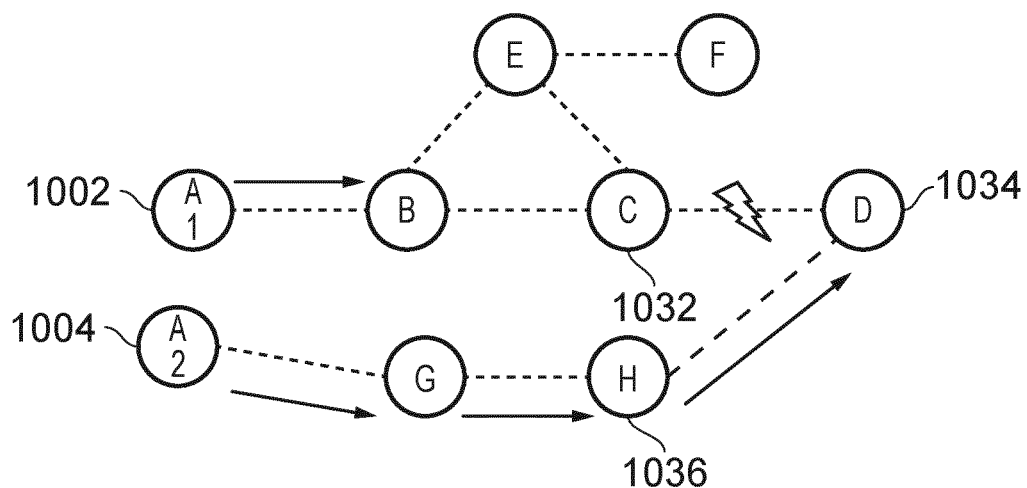
FIG. 10C is reproduced from [7], and shows a third example radio link failure example in IAB networks.

A third scenario is shown in FIG. 10C. Here, RLF occurs between a parent node C 1032 and its child node D 1034. However unlike the second scenario as described above by way of FIG. 10B, there are no candidates available as a new parent node for the child node 1034 to establish a new connection with in order to communicate to the donor node 1002. The child node 1034 therefore has to reconnect to the other IAB donor node 1004 via a new route. This is achieved by reconnecting to a new parent node on the new route, which in the example of FIG. 10C is IAB node H 1036. Thus, the child node 1034 is still able to communicate on the uplink to a donor node 1004 which is connected to the core network.

Bandwidth Parts (BWP)

A communications device and an infrastructure equipment, such as the communications device 4 and infrastructure equipment 1 of FIG. 1 or the communications device 14 and infrastructure equipment (TRP) 10 of FIG. 2, are configured to communicate via a wireless access interface. The wireless access interface may comprise one or more carriers, each providing, within a range of carrier frequencies, communications resources for transmitting and receiving signals according to a configuration of the wireless access interface. The one or more carriers may be configured within a system bandwidth provided for the wireless communications network of which the infrastructure equipment 1, 10 forms part. Each of the carriers may be divided in a frequency division duplex scheme into an uplink portion and a downlink portion and may comprise one or more bandwidth parts (BWPs). A carrier may be configured therefore with a plurality of different BWP for a communications device to transmit or receive signals. The nature of the wireless access interface may be different amongst the different BWPs. For example, where the wireless access interface is based on orthogonal frequency division multiplexing, different BWPs may have different sub-carrier spacing, symbol periods and/or cyclic prefix lengths. BWPs may have different bandwidths.

By configuring BWPs appropriately, the infrastructure equipment may provide BWPs which are suited for different types of services. For example, a BWP more suitable for eMBB may have a larger bandwidth in order to support high data rates. A BWP suited for URLLC services may use a higher sub-carrier spacing and shorter slot durations, in order to permit lower latency transmissions. Parameters of the wireless access interface which are applicable to a BWP may be referred to collectively as the numerology of a BWP. Examples of such parameters are sub-carrier spacing, symbol and slot durations and cyclic prefix length.

Figure 11:
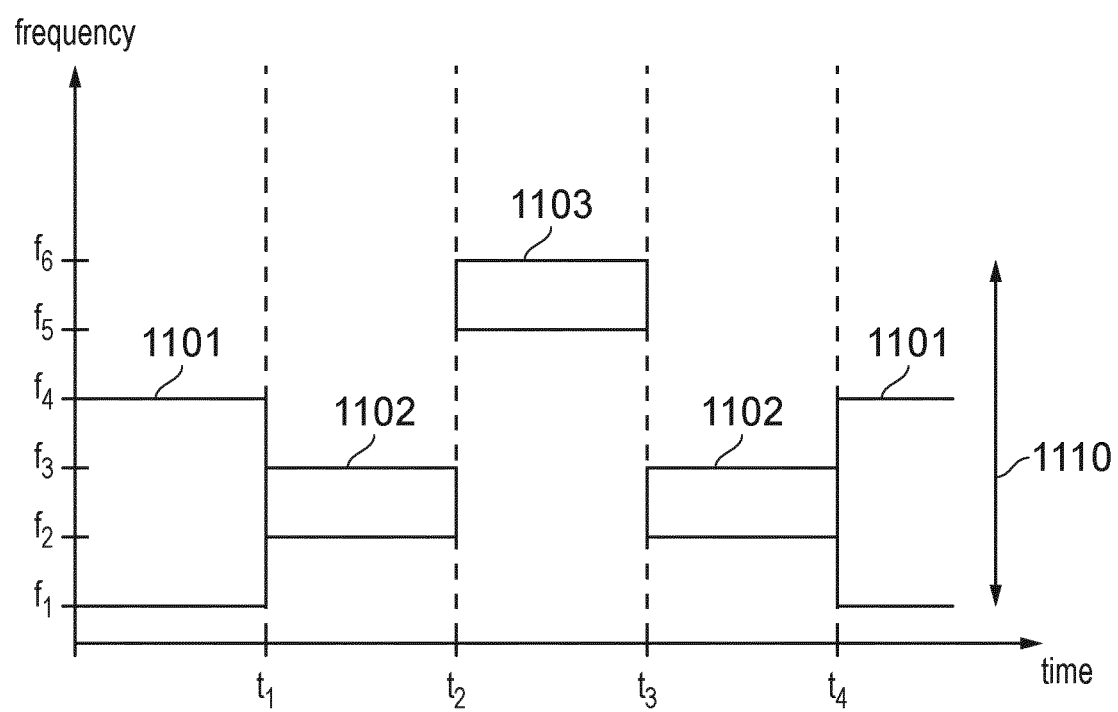
FIG. 11 illustrates a portion of a wireless access interface, in which the system bandwidth comprises multiple bandwidth parts which may be activated and deactivated independently.

FIG. 11 shows an example of first to third BWPs 1101, 1102, 1103 configured within a system bandwidth 1110 extending from frequency f1 to frequency f6. Table 1 below provides a summary of the characteristics of each of the BWPs 1101, 1102, 1103. As shown in Table 1, each BWP may be identified by an index number (bwp-id).

TABLE 1

Summary of BWP characteristics

| BWP | Index (bwp-id) | Frequency range | Sub-carrier spacing |
| --- | --- | --- | --- |
| 1101 | 1 | f1-f4 | 15 kHz |
| 1102 | 2 | f2-f3 | 15 kHz |
| 1103 | 3 | f5-f6 | 60 kHz |

In the example in FIG. 11, the BWPs 1101, 1102, 1103 do not collectively span the entire system bandwidth 1110. However, in some examples, the frequency range of one or more BWPs collectively spans the system bandwidth 1110 (in other words, all frequencies in the system bandwidth may fall within at least one BWP). A frequency range of a BWP may be entirely within the frequency range of another BWP (in this case, the second BWP 1102 is within the bandwidth of the first BWP 1101).

A BWP may comprise communications resources for uplink or downlink communications. For a communications device, an uplink (UL) BWP and a downlink (DL) BWP may be independently configured, and an association (e.g. pairing) of an UL BWP and a DL BWP may be configured. In some examples, uplink and downlink communications resources are separated in time, in which case time division duplexing (TDD) may be used. In case of TDD, a BWP-pair (UL BWP and DL BWP with the same bwp-id) may have the same centre frequency. In some examples uplink and downlink communications resources are separated in frequency, in which case frequency division duplexing (FDD) may be used. Where FDD is used, a UL BWP and a DL BWP may comprise two non-contiguous frequency ranges, one comprising communications resources for uplink communications and one comprising communications resources for downlink communications. In the remainder of the present disclosure, the term 'bandwidth part' (BWP) is used to refer to a pair of associated uplink and downlink bandwidth parts and as such, may comprise communications resources for both uplink and downlink transmissions. The terms 'uplink bandwidth part' and 'downlink bandwidth part' will be used where appropriate to refer to a bandwidth part comprising only, respectively, uplink communications resources and downlink communications resources.

An activated BWP refers to a BWP which may be used for the transmission or reception of data to or from the communications device 4, 14. An infrastructure equipment 1, 10 may schedule transmissions to or by the communications device 4, 14 only on a BWP if that BWP is currently activated for the communications device 4, 14. On deactivated BWPs, the communications device 4, 14 may not monitor a PDCCH and may not transmit on PUCCH, PRACH and UL-SCH.

Conventionally, as illustrated in FIG. 11, at most one BWP providing uplink communications resources and at most one BWP providing downlink communications resources may be activated at any given time in respect of a particular communications device. In the example of FIG. 11, initially (prior to time t1), only the first BWP 1101 is activated. At time t1, the first BWP 1101 is deactivated and the second BWP 1102 is activated. Subsequently, at time t2, the second BWP 1102 is deactivated. From t2 to t3, only the third BWP 1103 is activated; from t3 to t4 only the second BWP 1102 is activated, and at t4, the first BWP 1101 is activated and the second BWP 1102 is deactivated.

In light of the differing numerologies which may be applicable to BWPs, a single activated BWP may not be suitable for the transmission of data associated with different services, if those different services have different requirements (e.g. latency requirements) or characteristics (e.g. bandwidth/data rate). Additionally or alternatively, there may be insufficient capacity on a single BWP for the requirements of a single communications device. Therefore, consideration has been given to the possibility of activating multiple BWPs for a single communications device, for example in co-pending European patent application number EP18195309.2 [8].

Initial, Primary and Default BWPs

A BWP may be designated as an initial downlink BWP, which provides the control resource set for downlink information used to schedule downlink transmissions of system information, and a corresponding initial uplink BWP for uplink transmissions for example for initiating PRACH transmission for initial access. A BWP may be designated as a primary BWP which is always activated and which may be used for transmitting control information to or by the communications device 4, 14.

Since the primary BWP is always activated and thus may be used for data transmission, it may only be necessary to activate one or more further (secondary) BWPs if the primary BWP is unsuitable for an ongoing or new service or insufficient e.g. due to congestion or lack of bandwidth. Alternatively or additionally, a BWP may be designated as a default BWP. If no BWP is explicitly configured as a default BWP, a BWP which is designated as the initial BWP may be the default BWP.

A default BWP may be defined as a BWP that a UE falls back to after an inactivity timer, associated with a BWP other than the default BWP, expires. For example, where a non-default BWP is deactivated as a result of an associated inactivity timer expiring, and no other non-default BWP is activated, then a default BWP may be activated in response. A default BWP may have an activation or deactivation priority which differs from the activation or deactivation priority of other, non-default, BWPs. A default BWP may be preferentially activated and/or may be deactivated with lowest preference. For example, a default BWP may remain activated unless and until a further BWP is to be activated such that a maximum number of activated BWPs would be exceeded. A default BWP may further be preferentially used for transmitting an indication that a different BWP is to be activated or de-activated.

Beam Failure Recovery in NR

According to some radio access technologies, including the NR radio access technologies under development by 3GPP, a cell may be formed (or, in other words, 'generated') by a plurality of directional beams. Each beam may be characterised by a variance in gain with respect to a direction from the antenna; a beam may be considered 'wide', where the gain is consistently relatively high over a broad range of directions, or 'narrow', where relatively high gain is only achieved over a narrow range of directions. Depending on the direction of the communications device with respect to the infrastructure equipment, the gain of a particular beam may be sufficiently high (and the resulting coupling loss sufficiently low) to permit communications between the communications device and the infrastructure equipment via the beam. Beams may be formed for transmitting or receiving at the infrastructure equipment using phased antenna arrays, directional antennas, a combination of both, or other known techniques. Generally, a beam is named as a Transmission Configuration Indication (TCI) state in NR.

Communications resources such as a particular BWP may be associated with one or more beams. In other words, the infrastructure equipment may transmit or receive using communications resources on all or some subset of beams A beam may be said to be 'activated' in respect of communications resources, if the infrastructure equipment transmits or receives on those communications resources using that beam. For example, one or more beams may be activated in respect of a BWP. Different communications devices within the same cell may use different sets of beams.

Provided at least one activated beam (or TCI state) remains available for communication, then beam management processes can update and adapt the set of activated beams in response to one or more beams becoming unsuitable. Such beam management as used herein refers collectively to processes and techniques such as the measurement of signals transmitted on one or more beams, an assessment as to whether one or more beams satisfy respective beam failure conditions, indications transmitted by the communications device to the infrastructure equipment to indicate whether or not one or more beams satisfy respective beam failure conditions, a determination that the configuration or activated set of beams are modified, and transmissions indicating control information relating to the beams sent using an activated beam which has not satisfied the beam failure conditions. However, should all beams satisfy the beam failure conditions based on measurements from pre-configured reference signals, then it is necessary to initiate a procedure to recover from this situation. This procedure is referred to as beam failure recovery.

In more detail for NR, the beam failure recovery (BFR) procedure is introduced in [9]. As described in [9], for beam failure detection, the gNodeB configures the UE with beam failure detection reference signals and the UE declares beam failure when the number of consecutive beam failure instance indications from the physical layer reaches a configured threshold within a configured period. After beam failure is detected, the UE:

triggers beam failure recovery by initiating a Random Access procedure on the PCell;
  selects a suitable beam to perform beam failure recovery (if the gNodeB has provided dedicated Random Access resources for certain beams, those will be prioritised by the UE);
  Receives gNodeB responses (i.e. DCI) on a preconfigured search space named as "recoverySearchSpaceId".

Upon completion of the Random Access procedure, beam failure recovery is considered complete.

In an example beam failure recovery procedure initiated in response to a determination that activated beams satisfy the respective beam failure conditions, the communications device performs measurements of the signal strength (e.g. reference signal received power, RSRP) of the channel state information reference signals (CSI-RS) or synchronisation signal blocks associated with one or more beams which are configured but not activated. The measurements may be compared against a predetermined threshold, such as an RSRP threshold. If the communications device determines that the measurements associated with the one or more beams which are configured but not activated exceed the predetermined threshold, then the communications device transmits a beam failure recovery request message (which is an example of a beam failure indication) as a random access message using a physical random access channel (PRACH) of the new identified beam. Communications resources on the PRACH may have been previously indicated as suitable for non-contention based random access transmissions, in which case the beam failure recovery request message may be transmitted in a contention-free manner using those resources. Otherwise, the beam failure recovery request message may be transmitted in a contention based manner if dedicated resources are not configured.

After transmitting the beam failure recovery request message, the communications device monitors downlink communications resources associated with the new identified beam. More specifically, the communications device may monitor a configured recovery search space, which may be a 'recoverySearchSpace' as described above with relation to [9], having as an identity a 'recoverySearchSpaceId', for downlink control information (DCI). If the communications device receives downlink control information in the configured communications resources, which indicates that communications resources on a shared downlink channel (such as the physical downlink shared channel, PDSCH) are scheduled to be used for the transmission by the infrastructure equipment of a response to the beam failure recovery request message, then the communications device determines that the beam failure recovery is successful. In response to receiving the downlink control information, the communications device sets the new identified beam as an activated beam. The new (activated) beam can be used for subsequent communications between the infrastructure equipment and the communications device, including the transmission of control information to indication one or more beams which are to be activated for the communications device. The communications device may decode and process data transmitted using the scheduled communications resources on the shared downlink channel, for example in a conventional manner.

Referring again to FIGS. 6A and 6B, when the first IAB node 602 encounters a radio link problem (such as RLF or a beam failure) with its parent node e.g. IAB donor 601, it will initiate a random access (RACH) procedure to a new candidate parent node. According to the latest RAN2 agreements, an RLF notification will send to its child nodes. During the RACH procedure, for in-band IAB deployment (same frequency band/BWP), the communication between the parent node and its child node e.g. the third IAB node 606 may be impacted. For example, it may be that the third (child) IAB node 606 cannot receive downlink data from the first (parent) IAB node 602 when the first IAB node 602 initiates a RACH procedure to a new parent node. There is therefore a need to optimise the resource configuration procedure in order to allow, for example, downlink transmission (signalling information transmissions and data transmissions for normal UEs and child node(s)) when an IAB node (e.g. first IAB node 602) initiates a RACH procedure (e.g. msg1 and msg3) on its uplink to a new parent node, as well as uplink reception from UEs and its child node(s) when the first IAB node 602 is waiting for msg2 and msg4 from the new parent node. Embodiments of the present technique seek to provide optimised resource configuration procedures so as to achieve such advantages.

There have been no previous discussions in IAB of how to ease the uplink/downlink transmission impact when one IAB node encounters RLF and initiates an RRC re-establishment procedure. In [10] it is proposed that "in order to address the half-duplex constraint, one straightforward option is to introduce additional PRACH resources for the backhaul link which are orthogonal to those used by the access link and to adjacent backhaul links" However, embodiments of the present technique address not only the half-duplex case with respect to RACH procedures, but also the half-duplex with respect to both RACH procedures and data transmission (for example in the configuration of initial BWPs and dedicated BWPs). Furthermore, embodiments of the present technique address the coordination in the CU and the signalling between CU and IAB node as well as between IAB nodes themselves.

BWPs for RACH Enhancements in IAB

Figure 12:
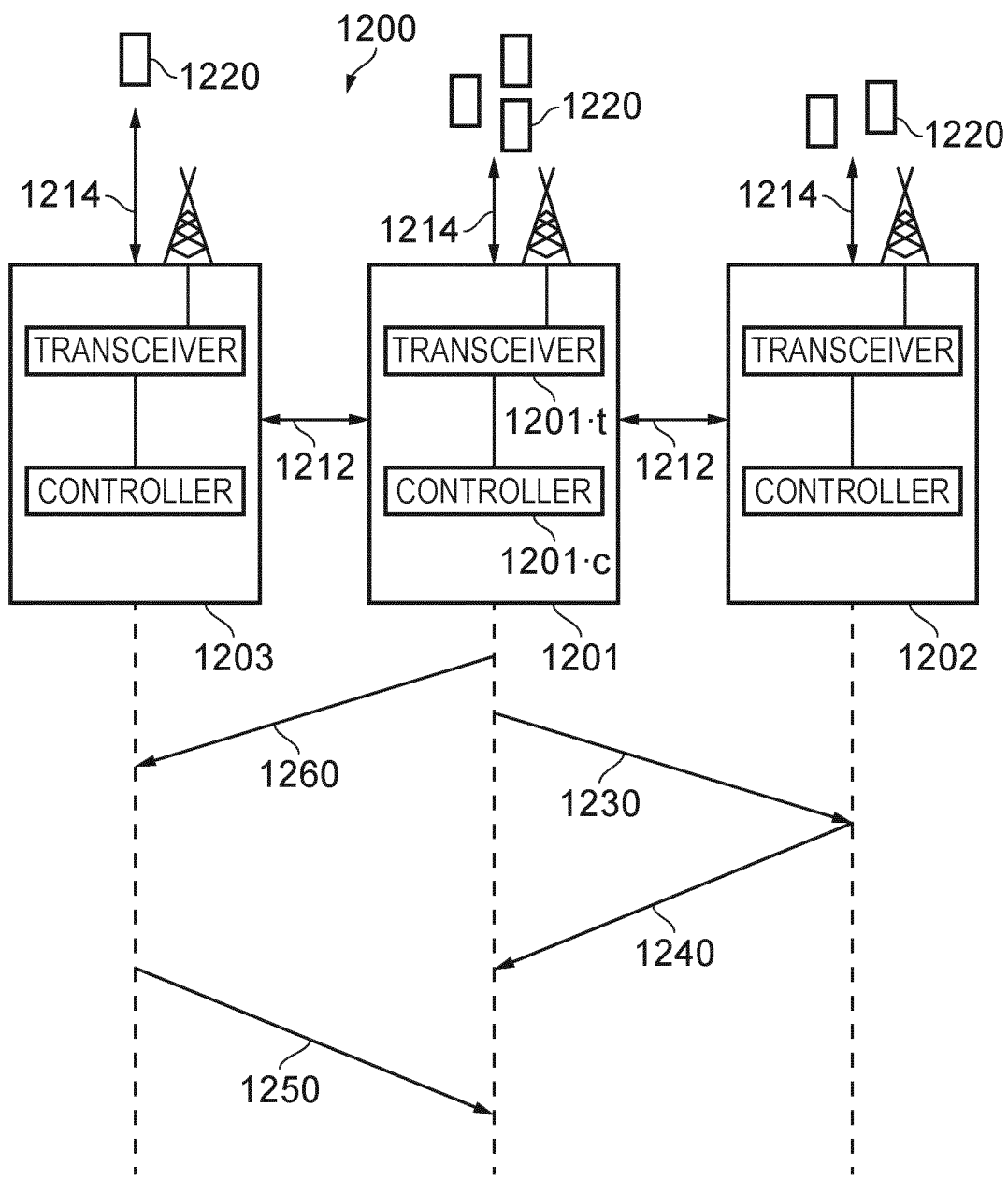
FIG. 12 shows a part schematic, part message flow diagram of communications in a wireless communications system in accordance with embodiments of the present technique.

FIG. 12 shows a part schematic, part message flow diagram of communications in a wireless communications network 1200 in accordance with embodiments of the present technique. The wireless communications network 1200 comprises a plurality of infrastructure equipment 1201, 1202, 1203 (including a first infrastructure equipment 1201) each being configured to communicate with one or more others of the infrastructure equipment 1201, 1202, 1203 via a backhaul communications link 1212 within a system bandwidth. One or more of the first infrastructure equipment 1201 and the plurality of other infrastructure equipment 1202, 1203 are each configured to communicate with one or more communications devices 1220 via an access link 1214 within the system bandwidth. The system bandwidth comprises a plurality of bandwidth parts, each of the bandwidth parts being formed of a contiguous set of frequency resources that is smaller than and within the system bandwidth. The first infrastructure equipment 1201 comprises transceiver circuitry 1201.t and controller circuitry 1201.c which are configured in combination to transmit 1230 radio signals to and/or to receive 1240 radio signals from a second of the infrastructure equipment 1202 using frequency resources of a first of the bandwidth parts, the first infrastructure equipment 1201 being connected to the second infrastructure equipment 1201 on a downlink of the first infrastructure equipment 1201 and configured to allocate uplink communications resources to the second infrastructure equipment 1202, and to transmit 1250 radio signals to and/or to receive 1260 radio signals from a third of the infrastructure equipment 1203 using frequency resources of a second of the bandwidth parts, the first infrastructure equipment 1201 being connected to the third infrastructure equipment 1203 on an uplink of the first infrastructure equipment 1201 and configured to receive allocated uplink communications resources from the third infrastructure equipment 1203, wherein the frequency resources of the first bandwidth part are distinct from and do not overlap with the frequency resources of the second bandwidth part.

In the example of FIG. 12, the first infrastructure equipment 1201 is a parent node to the second infrastructure equipment 1202, which is its child node, and is thus responsible for forwarding signals from it to a core network part of the wireless communications network 1200 as well as allocating it uplink resources to communicate with the first infrastructure equipment 1201. Correspondingly, the third infrastructure equipment 1203 is the parent node of the first infrastructure equipment 1201. It should be appreciated that a child node may have a connection to more than one parent node.

In some arrangements of embodiments of the present technique, the first infrastructure equipment may communicate with the one or more of the plurality of other infrastructure equipment via the backhaul communications link by periodically transmitting a plurality of beams of radio signals in at least one of different spatial directions and at different times.

Essentially then, embodiments of the present technique allow for the configuration of BWPs to be carefully selected for IAB nodes in order to realise simultaneous uplink/downlink transmission to or from both their parent node and either the UEs they server or their child node(s). In particular, in at least some implementations, embodiments of the present technique allow for the configuration of BWPs for IAB nodes that support random access (RACH) procedures to a parent node while allowing simultaneous communication with their child node(s)/UEs, as well as avoiding any uplink/downlink interruption or interference to such communication with their child node(s) whilst performing such a RACH procedure. In other words, in such implementations, the first infrastructure equipment is configured to perform a random access, RACH, procedure to initiate communication with the third infrastructure equipment, wherein the RACH procedure is performed by transmitting RACH messages and/or receiving RACH messages within the frequency resources of the second bandwidth part simultaneously to either transmitting radio signals to the second infrastructure equipment using the frequency resources of the first bandwidth part, or receiving radio signals from the second infrastructure equipment using the frequency resources of the first bandwidth part.

Referring back to FIG. 6A—and taking the first IAB node 602 as being equivalent to the first infrastructure equipment 1201, the third IAB node 606 (child node to first IAB node 602) as being equivalent to the second infrastructure equipment 1201, and the donor IAB node 601 (parent node to first IAB node 602) as being equivalent to the third infrastructure equipment 1203—if both the first IAB node 602 and the third IAB node 606 perform a RACH procedure, embodiments of the present technique provide techniques to ensure that both will be successful. RACH resource transmissions according to embodiments of the present technique will be on different BWPs, and the RAR will be sent on a non-interfering BWP. This is different to normal traffic, because the same BWP may be activated and used for different purposes at different times. However, the duration of an RAR in the time domain may be large enough so as to not allow any transmission/reception on the other link, and so this is another problem that embodiments of the present technique seek to address. Additionally, the third IAB node 606 may perform a RACH procedure at the same time as both the first IAB node 602 and the second IAB node 604 (i.e. both of its potential parent nodes) are performing a RACH procedure.

In at least some embodiments of the present technique, the central unit (CU) node configures each of the IAB nodes in the network with BWPs. For example, the first infrastructure equipment may be configured to receive a bandwidth part configuration message from a central unit node of the wireless communications network, the central unit node being connected to a core network part of the wireless communications network, the bandwidth part configuration message comprising an indication of the frequency resources of the first bandwidth part and an indication of the frequency resources of the second bandwidth part. Here, the bandwidth part configuration message further comprises an indication of frequency resources of one or more other bandwidth parts in addition to the first and second bandwidth parts to be used by the first infrastructure equipment for transmitting the radio signals to and/or receiving the radio signals from the second infrastructure equipment and/or the third infrastructure equipment. The central unit node may be a donor node of the wireless communications network, or may alternatively be connected to a donor node in the downstream. In the example of FIG. 12, the third infrastructure equipment (i.e. parent node) 1203 may be a donor node.

In an arrangement of embodiments of the present technique, the CU node may configure different BWPs for the upstream and the downstream of each IAB node, so as to avoid the same BWP being configured on the child IAB node and its parent IAB node. In other words, the first infrastructure equipment is then configured to determine from the bandwidth part configuration message that the frequency resources of the first bandwidth part are to be used by the first infrastructure equipment for transmitting the radio signals to and/or receiving the radio signals from the second infrastructure equipment and that the frequency resources of the second bandwidth part are to be used by the first infrastructure equipment for transmitting the radio signals to and/or receiving the radio signals from the third infrastructure equipment. It should be noted that, for TDD, the UL and DL BWPs will be the same, and for FDD, the UL and DL BWPs could be different. In other words, the first infrastructure equipment may be configured (for TDD) to transmit the radio signals to and to receive the radio signals from the second infrastructure equipment using the frequency resources of the first bandwidth part, and to transmit the radio signals to and to receive the radio signals from the third infrastructure equipment using the frequency resources of the second bandwidth part. Alternatively, the first infrastructure equipment may be configured (for FDD) either to transmit the radio signals to and to receive the radio signals from the second infrastructure equipment using the frequency resources of the first bandwidth part or to transmit the radio signals to the second infrastructure equipment using the frequency resources of the first bandwidth part and to receive the radio signals from the second infrastructure equipment using the frequency resources of one of the other bandwidth parts, and either to transmit the radio signals to and to receive the radio signals from the third infrastructure equipment using the frequency resources of the second bandwidth part, or to transmit the radio signals to the third infrastructure equipment using the frequency resources of the second bandwidth part and to receive the radio signals from the third infrastructure equipment using the frequency resources of one of the other bandwidth parts.

Figure 13:
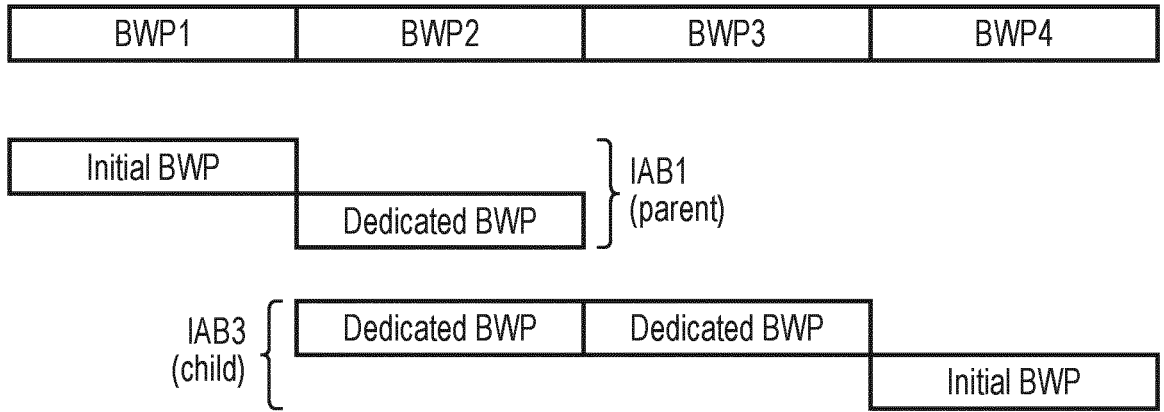
FIG. 13 shows a first example of BWP configurations for a time division duplexing (TDD) case in accordance with embodiments of the present technique.

Taking TDD as an example as shown in FIG. 13, where in this example, there are four candidate BWPs in the system carrier bandwidth; BWP1, BWP2, BWP3 and BWP4. The CU may configure the first IAB node 602 with BWP1 and BWP2 (for communication with both its parent node, the IAB donor node 601 and its child node, the third IAB node 606), and the third IAB node 606, with BWP2, BWP3 and BWP4 (for communication with both its parent node, the first IAB node 602 and its child node, such as the eighth IAB node 620 as shown in FIG. 6B). In this case, although the first IAB node 602 may need to RACH to a new parent node with BWP1, it can still transmit/receive data to/from the third IAB node 606 on BWP2, as both the first IAB node 602 and third IAB node 606 are configured with BWP2.

Figure 14:
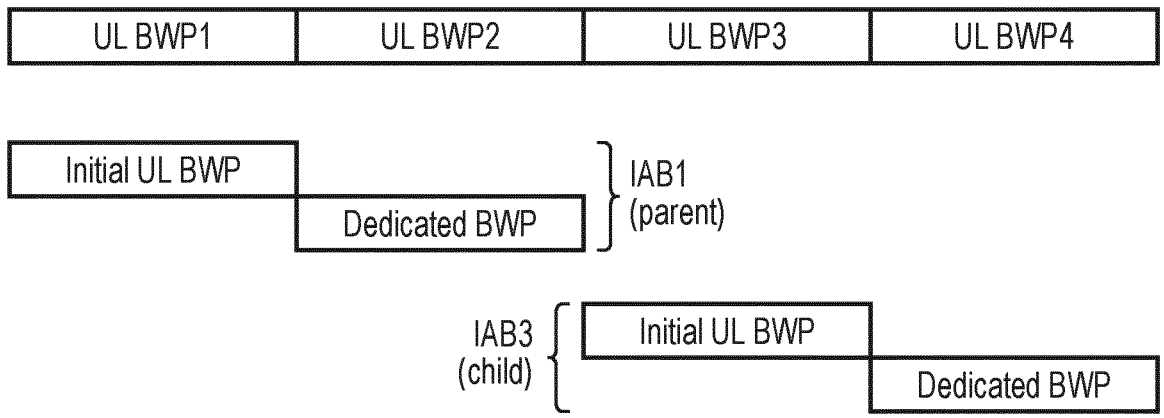
FIG. 14 shows a second example of BWP configurations for a frequency division duplexing (FDD) case in accordance with embodiments of the present technique.

Now taking FDD as an example as shown in FIG. 14, where in this example there are again four candidate UL BWPs in the system carrier bandwidth; BWP1, BWP2, BWP3 and BWP4. The CU may configure the first IAB node 602 with BWP1 and BWP2 (for communication with its parent node, the IAB donor node 601), and the third IAB node 606, with BWP3 and BWP4 (for communication with its parent node, the first IAB node 602). Although not shown in FIG. 14, the CU will also configure corresponding BWPs in the DL for both the first IAB node 602 and the third IAB node 606.

As a result, in either of the TDD or FDD cases, RACH resources for an IAB node should be configured on a BWP different from other BWPs in operation in the neighbourhood, to ensure there are BWPs available for transmissions other than the RACH procedure. In this approach, the CU must maintain a detailed configuration of each IAB node in both the upstream and downstream directions. The F1 and/or RRC signaling should support the configuration and update of the BWP configuration on each IAB node. In the examples of both FIGS. 13 and 14, it should be appreciated that initial downlink BWPs contain SI and synchronisation signals necessary for initial access and initial uplink BWPs contain PRACH resources for initial access, while dedicated BWPs can be switched to if needed.

In an arrangement of embodiments of the present technique, the CU node may configure the BWPs on each IAB node, and then it will be up to each IAB node to select the appropriate BWP to support simultaneous transmission. In other words, the first infrastructure equipment is then configured to determine from the bandwidth part configuration message indicates that either of the frequency resources of the first bandwidth part or the frequency resources of the second bandwidth part are to be used by the first infrastructure equipment for transmitting the radio signals to and/or receiving the radio signals from the second infrastructure equipment and that either of the frequency resources of the first bandwidth part or the frequency resources of the second bandwidth part are to be used by the first infrastructure equipment for transmitting the radio signals to and/or receiving the radio signals from the third infrastructure equipment, and to select the frequency resources of the first bandwidth part to be used for transmitting the radio signals to and/or receiving the radio signals from the second infrastructure equipment and selecting the frequency resources of the second bandwidth part to be used for transmitting the radio signals to and/or receiving the radio signals from the third infrastructure equipment. For example the CU node may configure BWPs BWP1-BWP4 on every IAB node. When the first IAB node 602 needs to initiate a RACH to a new parent IAB node on, for example, BWP1, it will activate BWP2 on its child IAB node (for example the third IAB node 606) in order to transmit/receive data to/from the third IAB node 606 on BWP2. This approach requires switching between BWPs using L1 signaling only.

The CU may configure the IAB-DU or IAB-MTs using F1 interface or RRC signalling regarding which BWPs are to be used for RACH procedures, SIB transmissions and connected mode data transmission/reception. An IAB node will be operating as a mobile terminal when a RACH procedure is performed and so should rely on RACH parameters broadcasted by its upstream node. Therefore, it may be the case that the upstream node broadcasts RACH parameters for normal UEs in different a BWP compared to a BWP used to broadcast RACH resources for IAB nodes. Therefore, IAB nodes may use normal UE RACH resources once they have transitioned to connected mode and have received their own configurations via the F1 interface. For subsequent RACH procedures, a child IAB node always uses resources indicated to its specific parent IAB node.

In another arrangement of embodiments of the present technique, when an IAB node performs a RACH procedure, it will become out of service, e.g. it performs no UL and DL data transmission. In other words, the first infrastructure equipment is configured to perform a random access, RACH, procedure to initiate communication with the third infrastructure equipment, wherein the RACH procedure is performed by transmitting RACH messages and/or receiving RACH messages within the frequency resources of the second bandwidth part, wherein, whilst performing the RACH procedure, the first infrastructure equipment is configured to transmit or receive no radio signals other than the RACH messages using the frequency resources of any of the plurality of bandwidth parts.

In another arrangement of embodiments of the present technique, it may be that even the RACH cannot be received or transmitted by an IAB node (i.e. a true out of service state). In other words, the first infrastructure equipment is configured to enter an out-of-service state, wherein, when in the out-of-service state, the first infrastructure equipment is configured to transmit or receive no radio signals using the frequency resources of any of the plurality of bandwidth parts.

Flow Chart Representation

Figure 15:
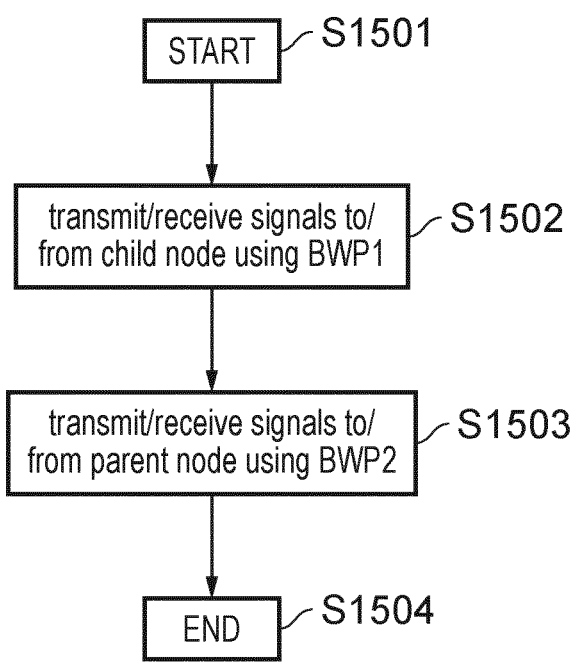
FIG. 15 shows a flow diagram illustrating a process of communications in a communications system in accordance with embodiments of the present technique.

FIG. 15 shows a flow diagram illustrating a process of communications in a communications system in accordance with embodiments of the present technique. The process shown by FIG. 15 is a method of operating a first infrastructure equipment forming part of a wireless communications network comprising a plurality of other infrastructure equipment, the first infrastructure equipment being configured to communicate with at least two of the plurality of other infrastructure equipment via a backhaul communications link within a system bandwidth, one or more of the first infrastructure equipment and the plurality of other infrastructure equipment each being configured to communicate with one or more communications devices via an access link within the system bandwidth, wherein the system bandwidth comprises a plurality of bandwidth parts, each of the bandwidth parts being formed of a contiguous set of frequency resources that is smaller than and within the system bandwidth.

The method begins in step S1501. The method comprises, in step S1502, transmitting radio signals to and/or receiving radio signals from a second of the infrastructure equipment using frequency resources of a first of the bandwidth parts, the first infrastructure equipment being connected to the second infrastructure equipment on a downlink of the first infrastructure equipment and configured to allocate uplink communications resources to the second infrastructure equipment. In step S1503, the method comprises transmitting radio signals to and/or receiving radio signals from a third of the infrastructure equipment using frequency resources of a second of the bandwidth parts, the first infrastructure equipment being connected to the third infrastructure equipment on an uplink of the first infrastructure equipment and configured to receive allocated uplink communications resources from the third infrastructure equipment. The frequency resources of the first bandwidth part are distinct from and do not overlap with the frequency resources of the second bandwidth part. The process ends in step S1504.

Those skilled in the art would appreciate that the method shown by FIG. 15 may be adapted in accordance with embodiments of the present technique. For example, other intermediate steps may be included in the method, or the steps may be performed in any logical order.

Though embodiments of the present technique have been described largely by way of the example system shown in FIG. 12, it would be clear to those skilled in the art that they could be equally applied to other systems, where for example there may be many more nodes or paths to choose from, or more hops between the donor and end nodes.

Those skilled in the art would also appreciate that such infrastructure equipment and/or wireless communications networks as herein defined may be further defined in accordance with the various arrangements and embodiments discussed in the preceding paragraphs. It would be further appreciated by those skilled in the art that such infrastructure equipment and wireless communications networks as herein defined and described may form part of communications systems other than those defined by the present invention.

The following numbered paragraphs provide further example aspects and features of the present technique:

Paragraph 1. A method of operating a first infrastructure equipment forming part of a wireless communications network comprising a plurality of other infrastructure equipment, the first infrastructure equipment being configured to communicate with at least two of the plurality of other infrastructure equipment via a backhaul communications link within a system bandwidth, one or more of the first infrastructure equipment and the plurality of other infrastructure equipment each being configured to communicate with one or more communications devices via an access link within the system bandwidth, wherein the system bandwidth comprises a plurality of bandwidth parts, each of the bandwidth parts being formed of a contiguous set of frequency resources that is smaller than and within the system bandwidth, the method comprising transmitting radio signals to and/or receiving radio signals from a second of the infrastructure equipment using frequency resources of a first of the bandwidth parts, the first infrastructure equipment being connected to the second infrastructure equipment on a downlink of the first infrastructure equipment and configured to allocate uplink communications resources to the second infrastructure equipment, and transmitting radio signals to and/or receiving radio signals from a third of the infrastructure equipment using frequency resources of a second of the bandwidth parts, the first infrastructure equipment being connected to the third infrastructure equipment on an uplink of the first infrastructure equipment and configured to receive allocated uplink communications resources from the third infrastructure equipment, wherein the frequency resources of the first bandwidth part are distinct from and do not overlap with the frequency resources of the second bandwidth part.

Paragraph 2. A method according to Paragraph 1, comprising performing a random access, RACH, procedure to initiate communication with the third infrastructure equipment, wherein the RACH procedure is performed by transmitting RACH messages and/or receiving RACH messages within the frequency resources of the second bandwidth part simultaneously to either:

transmitting radio signals to the second infrastructure equipment using the frequency resources of the first bandwidth part, or receiving radio signals from the second infrastructure equipment using the frequency resources of the first bandwidth part.

Paragraph 3. A method according to Paragraph 1 or Paragraph 2, comprising receiving a bandwidth part configuration message from a central unit node of the wireless communications network, the central unit node being connected to a core network part of the wireless communications network, the bandwidth part configuration message comprising an indication of the frequency resources of the first bandwidth part and an indication of the frequency resources of the second bandwidth part.

Paragraph 4. A method according to Paragraph 3, wherein the bandwidth part configuration message further comprises an indication of frequency resources of one or more other bandwidth parts to be used by the first infrastructure equipment for transmitting the radio signals to and/or receiving the radio signals from the second infrastructure equipment and/or the third infrastructure equipment.

Paragraph 5. A method according to Paragraph 3 or Paragraph 4, comprising determining from the bandwidth part configuration message that the frequency resources of the first bandwidth part are to be used by the first infrastructure equipment for transmitting the radio signals to and/or receiving the radio signals from the second infrastructure equipment and that the frequency resources of the second bandwidth part are to be used by the first infrastructure equipment for transmitting the radio signals to and/or receiving the radio signals from the third infrastructure equipment.

Paragraph 6. A method according to any of Paragraphs 3 to 5, comprising determining from the bandwidth part configuration message indicates that either of the frequency resources of the first bandwidth part or the frequency resources of the second bandwidth part are to be used by the first infrastructure equipment for transmitting the radio signals to and/or receiving the radio signals from the second infrastructure equipment and that either of the frequency resources of the first bandwidth part or the frequency resources of the second bandwidth part are to be used by the first infrastructure equipment for transmitting the radio signals to and/or receiving the radio signals from the third infrastructure equipment, and selecting the frequency resources of the first bandwidth part to be used for transmitting the radio signals to and/or receiving the radio signals from the second infrastructure equipment and selecting the frequency resources of the second bandwidth part to be used for transmitting the radio signals to and/or receiving the radio signals from the third infrastructure equipment.

Paragraph 7. A method according to any of Paragraphs 3 to 6, wherein the central unit node is a donor node of the wireless communications network.

Paragraph 8. A method according to any of Paragraphs 3 to 7, wherein the central unit node is connected to a donor node of the wireless communications network.

Paragraph 9. A method according to Paragraph 7 or Paragraph 8, wherein the third infrastructure equipment is the donor node.

Paragraph 10. A method according to any of Paragraphs 1 to 9, comprising transmitting the radio signals to and receiving the radio signals from the second infrastructure equipment using the frequency resources of the first bandwidth part, and transmitting the radio signals to and receiving the radio signals from the third infrastructure equipment using the frequency resources of the second bandwidth part.

Paragraph 11. A method according to any of Paragraphs 4 to 10, comprising either:
transmitting the radio signals to and receiving the radio signals from the second infrastructure equipment using the frequency resources of the first bandwidth part, or
transmitting the radio signals to the second infrastructure equipment using the frequency resources of the first bandwidth part and receiving the radio signals from the second infrastructure equipment using the frequency resources of one of the other bandwidth parts, and either:
transmitting the radio signals to and receiving the radio signals from the third infrastructure equipment using the frequency resources of the second bandwidth part, or
transmitting the radio signals to the third infrastructure equipment using the frequency resources of the second bandwidth part and receiving the radio signals from the third infrastructure equipment using the frequency resources of one of the other bandwidth parts.

Paragraph 12. A method according to any of Paragraphs 1 to 11, comprising
performing a random access, RACH, procedure to initiate communication with the third infrastructure equipment, wherein the RACH procedure is performed by transmitting RACH messages and/or receiving RACH messages within the frequency resources of the second bandwidth part,
wherein, whilst performing the RACH procedure, the first infrastructure equipment is configured to transmit or receive no radio signals other than the RACH messages using the frequency resources of any of the plurality of bandwidth parts.

Paragraph 13. A method according to any of Paragraphs 1 to 12, comprising
entering an out-of-service state, wherein, when in the out-of-service state, the first infrastructure equipment is configured to transmit or receive no radio signals using the frequency resources of any of the plurality of bandwidth parts.

Paragraph 14. A method according to any of Paragraphs 1 to 13, wherein the first infrastructure equipment communicates with the one or more of the plurality of other infrastructure equipment via the backhaul communications link by periodically transmitting a plurality of beams of radio signals in at least one of different spatial directions and at different times.

Paragraph 15. A first infrastructure equipment forming part of a wireless communications network comprising a plurality of other infrastructure equipment, the first infrastructure equipment being configured to communicate with at least two of the plurality of other infrastructure equipment via a backhaul communications link within a system bandwidth, one or more of the first infrastructure equipment and the plurality of other infrastructure equipment each being configured to communicate with one or more communications devices via an access link within the system bandwidth, wherein the system bandwidth comprises a plurality of bandwidth parts, each of the bandwidth parts being formed of a contiguous set of frequency resources that is smaller than and within the system bandwidth, wherein the first infrastructure equipment comprises transceiver circuitry and controller circuitry which are configured in combination
to transmit radio signals to and/or to receive radio signals from a second of the infrastructure equipment using frequency resources of a first of the bandwidth parts, the first infrastructure equipment being connected to the second infrastructure equipment on a downlink of the first infrastructure equipment and configured to allocate uplink communications resources to the second infrastructure equipment, and
to transmit radio signals to and/or to receive radio signals from a third of the infrastructure equipment using frequency resources of a second of the bandwidth parts, the first infrastructure equipment being connected to the third infrastructure equipment on an uplink of the first infrastructure equipment and configured to receive allocated uplink communications resources from the third infrastructure equipment,
wherein the frequency resources of the first bandwidth part are distinct from and do not overlap with the frequency resources of the second bandwidth part.

Paragraph 16. Circuitry for a first infrastructure equipment forming part of a wireless communications network comprising a plurality of other infrastructure equipment, the first infrastructure equipment being configured to communicate with at least two of the plurality of other infrastructure equipment via a backhaul communications link within a system bandwidth, one or more of the first infrastructure equipment and the plurality of other infrastructure equipment each being configured to communicate with one or more communications devices via an access link within the system bandwidth, wherein the system bandwidth comprises a plurality of bandwidth parts, each of the bandwidth parts being formed of a contiguous set of frequency resources that is smaller than and within the system bandwidth, wherein the first infrastructure equipment comprises transceiver circuitry and controller circuitry which are configured in combination
to transmit radio signals to and/or to receive radio signals from a second of the infrastructure equipment using frequency resources of a first of the bandwidth parts, the first infrastructure equipment being connected to the second infrastructure equipment on a downlink of the first infrastructure equipment and configured to allocate uplink communications resources to the second infrastructure equipment, and to transmit radio signals to and/or to receive radio signals from a third of the infrastructure equipment using frequency resources of a second of the bandwidth parts, the first infrastructure equipment being connected to the third infrastructure equipment on an uplink of the first infrastructure equipment and configured to receive allocated uplink communications resources from the third infrastructure equipment, wherein the frequency resources of the first bandwidth part are distinct from and do not overlap with the frequency resources of the second bandwidth part.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.
[2] RP-161901, "Revised work item proposal: Enhancements of NB-IoT", Huawei, HiSilicon, 3GPP TSG RAN Meeting #73, New Orleans, USA, Sep. 19-22, 2016.
[3] RP-170831, "New SID Proposal: Study on Integrated Access and Backhaul for NR", AT&T, 3GPP RAN Meeting #75, Dubrovnik, Croatia, March 2017.
[4] 3GPP TTR 38.874 "$3^{rd}$ Generation Partnership Project; Technical Specification Group Radio Access Network; Study on Integrated Access and Backhaul; (Release 15)", $3^{rd}$ Generation Partnership Project, February 2018.
[5] R2-1801606, "Proposals on IAB Architecture", Qualcomm et al, 3GPP TSG-RAN WG2 NR Ad hoc 1801, Vancouver, Canada, Jan. 22-26, 2018.
[6] R3-181502, "Way Forward—IAB Architecture for L2/3 relaying", Qualcomm et al, 3GPP TSG-RAN WG3 Meeting #99, Athens, Greece, Feb. 26-Mar. 2, 2018.
[7] R3-185312, "IAB failure recovery as part of route management", Samsung, 3GPP TSG-RAN WG3 Meeting #101, Gothenburg, Sweden, Aug. 20-24, 2018.
[8] European patent application number EP18195309.2.
[9] TS 38.300, "NR and NG-RAN Overall Description; Stage 2 (Release 15)", 3rd Generation Partnership Project.
[10] R2-1905033, "Overview of RAN1 impacts", Huawei, 3GPP TSG-RAN WG2 #105bis, Xi'an, China, Apr. 8-12, 2019.

What is claimed is:

1. A method of operating a first infrastructure equipment forming part of a wireless communications network comprising a plurality of other infrastructure equipment, the first infrastructure equipment being configured to communicate with at least two of the plurality of other infrastructure equipment via a backhaul communications link within a system bandwidth, one or more of the first infrastructure equipment and the plurality of other infrastructure equipment each being configured to communicate with one or more communications devices via an access link within the system bandwidth, wherein the system bandwidth comprises a plurality of bandwidth parts, each of the bandwidth parts being formed of a contiguous set of frequency resources that is smaller than and within the system bandwidth, the method comprising:

transmitting radio signals to and/or receiving radio signals from a second of the infrastructure equipment using frequency resources of a first of the bandwidth parts, the first infrastructure equipment being connected to the second infrastructure equipment on a downlink of the first infrastructure equipment and configured to allocate uplink communications resources to the second infrastructure equipment, and transmitting radio signals to and/or receiving radio signals from a third of the infrastructure equipment using frequency resources of a second of the bandwidth parts, the first infrastructure equipment being connected to the third infrastructure equipment on an uplink of the first infrastructure equipment and configured to receive allocated uplink communications resources from the third infrastructure equipment, wherein the frequency resources of the first bandwidth part are distinct from and do not overlap with the frequency resources of the second bandwidth part.

2. A method according to claim 1, comprising:
performing a random access, RACH, procedure to initiate communication with the third infrastructure equipment, wherein the RACH procedure is performed by transmitting RACH messages and/or receiving RACH messages within the frequency resources of the second bandwidth part simultaneously to either:
transmitting radio signals to the second infrastructure equipment using the frequency resources of the first bandwidth part, or
receiving radio signals from the second infrastructure equipment using the frequency resources of the first bandwidth part.

3. A method according to claim 1, comprising:
receiving a bandwidth part configuration message from a central unit node of the wireless communications network, the central unit node being connected to a core network part of the wireless communications network, the bandwidth part configuration message comprising an indication of the frequency resources of the first bandwidth part and an indication of the frequency resources of the second bandwidth part.

4. A method according to claim 3, wherein the bandwidth part configuration message further comprises an indication of frequency resources of one or more other bandwidth parts to be used by the first infrastructure equipment for transmitting the radio signals to and/or receiving the radio signals from the second infrastructure equipment and/or the third infrastructure equipment.

5. A method according to claim 3, comprising:
determining from the bandwidth part configuration message that the frequency resources of the first bandwidth part are to be used by the first infrastructure equipment for transmitting the radio signals to and/or receiving the radio signals from the second infrastructure equipment and that the frequency resources of the second bandwidth part are to be used by the first infrastructure equipment for transmitting the radio signals to and/or receiving the radio signals from the third infrastructure equipment.

6. A method according to claim 3, comprising:
determining from the bandwidth part configuration message indicates that either of the frequency resources of the first bandwidth part or the frequency resources of the second bandwidth part are to be used by the first infrastructure equipment for transmitting the radio signals to and/or receiving the radio signals from the second infrastructure equipment and that either of the frequency resources of the first bandwidth part or the frequency resources of the second bandwidth part are to be used by the first infrastructure equipment for transmitting the radio signals to and/or receiving the radio signals from the third infrastructure equipment, and
selecting the frequency resources of the first bandwidth part to be used for transmitting the radio signals to and/or receiving the radio signals from the second infrastructure equipment and selecting the frequency resources of the second bandwidth part to be used for transmitting the radio signals to and/or receiving the radio signals from the third infrastructure equipment.

7. A method according to claim 3, wherein the central unit node is a donor node of the wireless communications network.

8. A method according to claim 3, wherein the central unit node is connected to a donor node of the wireless communications network.

9. A method according to claim 7, wherein the third infrastructure equipment is the donor node.

10. A method according to claim 1, comprising:
transmitting the radio signals to and receiving the radio signals from the second infrastructure equipment using the frequency resources of the first bandwidth part, and
transmitting the radio signals to and receiving the radio signals from the third infrastructure equipment using the frequency resources of the second bandwidth part.

11. A method according to claim 4, comprising either:
transmitting the radio signals to and receiving the radio signals from the second infrastructure equipment using the frequency resources of the first bandwidth part, or
transmitting the radio signals to the second infrastructure equipment using the frequency resources of the first bandwidth part and receiving the radio signals from the second infrastructure equipment using the frequency resources of one of the other bandwidth parts, and either:
transmitting the radio signals to and receiving the radio signals from the third infrastructure equipment using the frequency resources of the second bandwidth part, or
transmitting the radio signals to the third infrastructure equipment using the frequency resources of the second bandwidth part and receiving the radio signals from the third infrastructure equipment using the frequency resources of one of the other bandwidth parts.

12. A method according to claim 1, comprising:
performing a random access, RACH, procedure to initiate communication with the third infrastructure equipment, wherein the RACH procedure is performed by transmitting RACH messages and/or receiving RACH messages within the frequency resources of the second bandwidth part,
wherein, whilst performing the RACH procedure, the first infrastructure equipment is configured to transmit or receive no radio signals other than the RACH messages using the frequency resources of any of the plurality of bandwidth parts.

13. A method according to claim 1, comprising:
entering an out-of-service state, wherein, when in the out-of-service state, the first infrastructure equipment is configured to transmit or receive no radio signals using the frequency resources of any of the plurality of bandwidth parts.

14. A method according to claim 1, wherein the first infrastructure equipment communicates with the one or more of the plurality of other infrastructure equipment via the backhaul communications link by periodically transmitting a plurality of beams of radio signals in at least one of different spatial directions and at different times.

15. A first infrastructure equipment forming part of a wireless communications network comprising a plurality of other infrastructure equipment, the first infrastructure equipment being configured to communicate with at least two of the plurality of other infrastructure equipment via a backhaul communications link within a system bandwidth, one or more of the first infrastructure equipment and the plurality of other infrastructure equipment each being configured to communicate with one or more communications devices via an access link within the system bandwidth, wherein the system bandwidth comprises a plurality of bandwidth parts, each of the bandwidth parts being formed of a contiguous set of frequency resources that is smaller than and within the system bandwidth, wherein the first infrastructure equipment comprises transceiver circuitry and controller circuitry which are configured in combination:
to transmit radio signals to and/or to receive radio signals from a second of the infrastructure equipment using frequency resources of a first of the bandwidth parts, the first infrastructure equipment being connected to the second infrastructure equipment on a downlink of the first infrastructure equipment and configured to allocate uplink communications resources to the second infrastructure equipment, and
to transmit radio signals to and/or to receive radio signals from a third of the infrastructure equipment using frequency resources of a second of the bandwidth parts, the first infrastructure equipment being connected to the third infrastructure equipment on an uplink of the first infrastructure equipment and configured to receive allocated uplink communications resources from the third infrastructure equipment,
wherein the frequency resources of the first bandwidth part are distinct from and do not overlap with the frequency resources of the second bandwidth part.

16. Circuitry for a first infrastructure equipment forming part of a wireless communications network comprising a plurality of other infrastructure equipment, the first infrastructure equipment being configured to communicate with at least two of the plurality of other infrastructure equipment via a backhaul communications link within a system bandwidth, one or more of the first infrastructure equipment and the plurality of other infrastructure equipment each being configured to communicate with one or more communications devices via an access link within the system bandwidth, wherein the system bandwidth comprises a plurality of bandwidth parts, each of the bandwidth parts being formed of a contiguous set of frequency resources that is smaller than and within the system bandwidth, wherein the first infrastructure equipment comprises transceiver circuitry and controller circuitry which are configured in combination:

to transmit radio signals to and/or to receive radio signals from a second of the infrastructure equipment using frequency resources of a first of the bandwidth parts, the first infrastructure equipment being connected to the second infrastructure equipment on a downlink of the first infrastructure equipment and configured to allocate uplink communications resources to the second infrastructure equipment, and to transmit radio signals to and/or to receive radio signals from a third of the infrastructure equipment using frequency resources of a second of the bandwidth parts, the first infrastructure equipment being connected to the third infrastructure equipment on an uplink of the first infrastructure equipment and configured to receive allocated uplink communications resources from the third infrastructure equipment, wherein the frequency resources of the first bandwidth part are distinct from and do not overlap with the frequency resources of the second bandwidth part.

17. The method according to claim 1, wherein at least one of the first bandwidth part and the second bandwidth part is a default bandwidth part.

18. The method according to claim 17, wherein the default bandwidth part is a bandwidth part adopted upon expiry of an activity counter in one of the first infrastructure equipment, the second infrastructure equipment, or the third infrastructure equipment.

19. The method according to claim 1, wherein the wireless communications network is a New Radio 5G communications network.

20. The method according to claim 1, wherein the downlink of the second infrastructure equipment and the uplink of the first infrastructure equipment are established using different telecommunications protocol standards.

\* \* \* \* \*